United States Patent
Don et al.

(10) Patent No.: US 8,060,710 B1
(45) Date of Patent: Nov. 15, 2011

(54) NON-DISRUPTIVE MIGRATION USING DEVICE IDENTITY SPOOFING AND PASSIVE/ACTIVE ORS PULL SESSIONS

(75) Inventors: Arieh Don, Newton, MA (US); Ofer E. Michael, Irvine, CA (US); Patrick Brian Riordan, Watertown, MA (US); Ian Wigmore, Westborough, MA (US); Anestis Panidis, Weston, MA (US)

(73) Assignee: EMC Corporation, Hopkinton, MA (US)

( * ) Notice: Subject to any disclaimer, the term of this patent is extended or adjusted under 35 U.S.C. 154(b) by 858 days.

(21) Appl. No.: 11/954,399

(22) Filed: Dec. 12, 2007

(51) Int. Cl.
*G06F 13/14* (2006.01)
(52) U.S. Cl. .......................... 711/161; 711/162
(58) Field of Classification Search .................. None
See application file for complete search history.

(56) References Cited

U.S. PATENT DOCUMENTS

| | | | | |
|---|---|---|---|---|
| 5,623,669 A | * | 4/1997 | Kincaid | 1/1 |
| 5,835,954 A | * | 11/1998 | Duyanovich et al. | 711/162 |
| 6,108,748 A | * | 8/2000 | Ofek et al. | 711/112 |
| 6,405,294 B1 | * | 6/2002 | Hayter | 711/162 |
| 7,058,731 B2 | * | 6/2006 | Kodama | 710/5 |
| 2007/0136524 A1 | * | 6/2007 | Murayama | 711/114 |

* cited by examiner

*Primary Examiner* — Hetul Patel
(74) *Attorney, Agent, or Firm* — Guerin & Rodriguez, LLP

(57) ABSTRACT

On-line storage devices are migrated to new storage devices in a non-disruptive manner. A host executing multipath I/O software is initially coupled to a source storage device via at least one active path. The target storage device is configured with the source device's device identification information. The target storage device is coupled to the host via a passive path so that the target storage device can return its device identification information to the host but cannot respond to I/O read or I/O write requests from the host. All paths between the host and the source storage device are then disconnected. An on-line data migration session between the source storage device and the target storage device is then activated. The path between the target storage device and the host is then re-configured from passive to active so that the target storage device can respond to I/O read and I/O write requests.

25 Claims, 25 Drawing Sheets

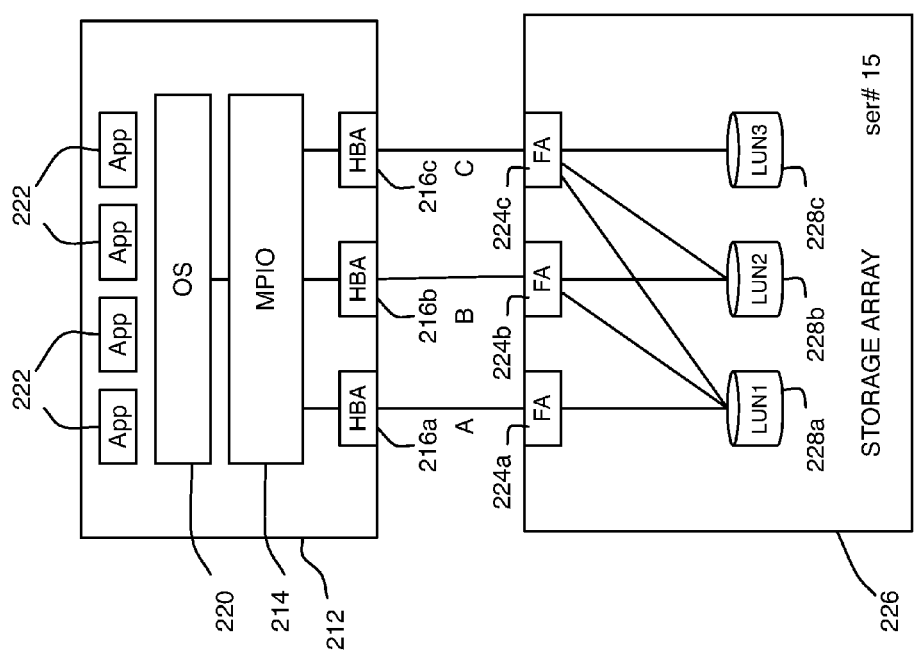

ured with the same device identification information as the source storage device. Then, the target storage device is coupled to the host via a passive path so that the target storage device can return its device identification information to the host but cannot respond to I/O read or I/O write requests from the host. Next, all paths between the host and the source storage device are disconnected. An on-line data migration session between the source storage device and the target storage device is then activated. Finally, the path between the target storage device and the host is re-configured from passive to active so that the target storage device can respond to I/O read and I/O write requests.

In particular, the target storage device is configured with the same device identification information as the source storage device so that the target storage device will respond to a SCSI inquiry request command from the host with a SCSI inquiry response including the source storage device identification information.
NON-DISRUPTIVE MIGRATION USING DEVICE IDENTITY SPOOFING AND PASSIVE/ACTIVE ORS PULL SESSIONS

FIELD OF THE INVENTION

The invention relates to data storage systems, and in particular to migration of data storage devices in data storage systems.

BACKGROUND OF THE INVENTION

Financial institutions such as National stock exchanges and banks demand that their computing and data storage systems suffer no more down time than a few minutes per year. Retail corporations are willing to pay millions of dollars to minimize the amount of time their computing and data storage systems need to be taken offline for maintenance or upgrade activities. It is important that storage system vendors provide high performance and high availability to satisfy these customers. But, when data storage devices need to be replaced, or swapped, or entire arrays replaced—also referred to as device or array "migration"—applications must suffer some downtime while storage links are disconnected from the original storage devices and reconnected to the new storage devices. It is an as yet unattained and very highly sought goal to provide a storage system wherein currently operating, on-line storage devices, and the data thereon, can be replaced with new storage devices in a non-disruptive manner wherein applications can continue to execute uninterrupted during the device replacement and data migration.

SUMMARY OF THE INVENTION

In accordance with the invention, there is provided an on-line data migration mechanism allowing currently operating, on-line storage devices to be replaced with new storage devices in a non-disruptive manner such that applications can continue to execute uninterrupted during the migration.

The invention is employed in a system wherein a host executes multipath I/O software. The host is initially coupled to a source storage device on a source storage array via at least one active path. The source storage device has device identification information. The non-disruptive data migration from the source storage device to a target storage device on a target storage array operates as follows.

First, the target storage device is configured with the same device identification information as the source storage device. Then, the target storage device is coupled to the host via a passive path so that the target storage device can return its device identification information to the host but cannot respond to I/O read or I/O write requests from the host. Next, all paths between the host and the source storage device are disconnected. An on-line data migration session between the source storage device and the target storage device is then activated. Finally, the path between the target storage device and the host is re-configured from passive to active so that the target storage device can respond to I/O read and I/O write requests.

In particular, the target storage device is configured with the same device identification information as the source storage device so that the target storage device will respond to a SCSI inquiry request command from the host with a SCSI inquiry response including the source storage device identification information.

The on-line data migration solution of the invention is operable in many system environments, including direct attached and fabric SANs.

BRIEF DESCRIPTION OF THE DRAWINGS

FIG. 6 is a schematic diagram depicting the operation of MPIO software between a host and storage array.

FIG. 7 is an example of a table used by the MPIO software of FIG. 6 for associating device IDs and host ports.

DETAILED DESCRIPTION OF EXEMPLARY EMBODIMENTS

Figure 1:
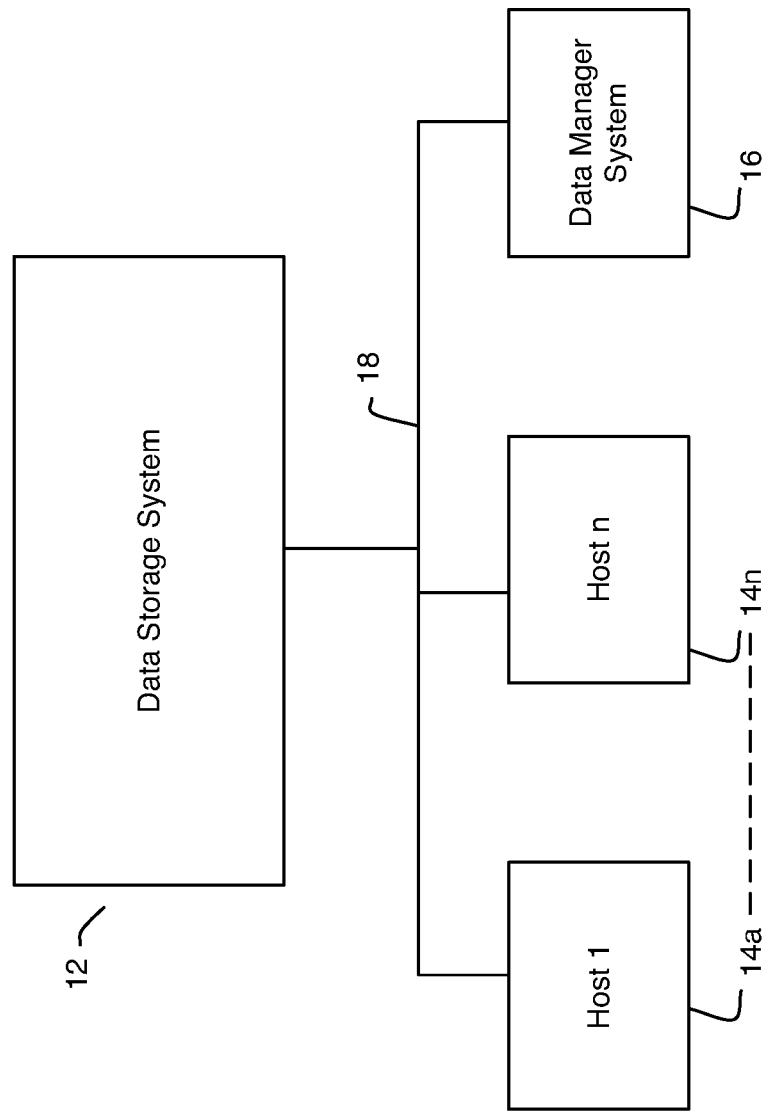
FIG. 1 is a schematic diagram of a computing system in which the invention can be employed.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other Fibre Channel switching equipment, or other switching equipment that may exist such as Ethernet, or a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a backup, mirroring or an administrative operation and may do so while performing data requests to the data storage system 12.

Figure 2:
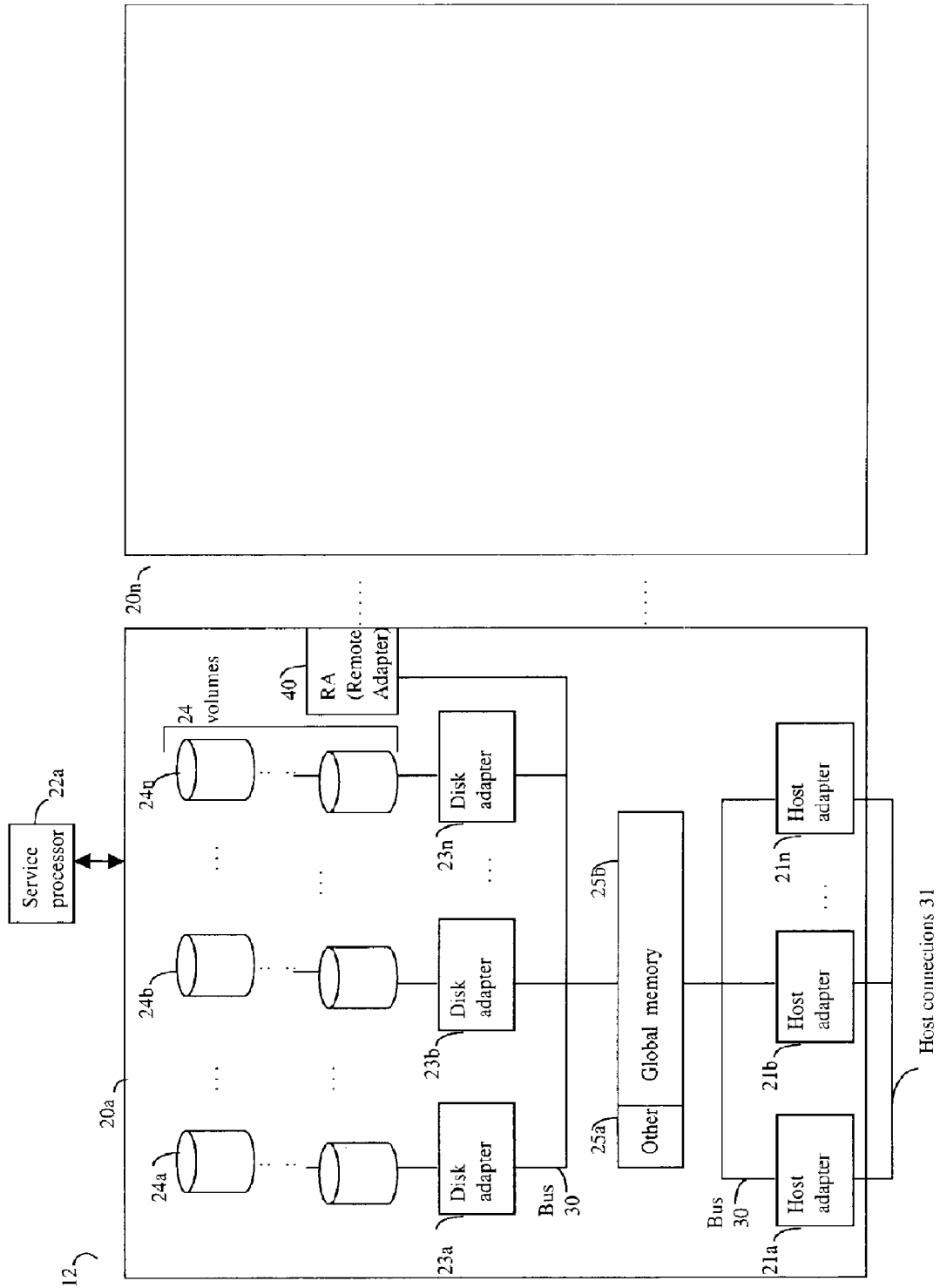
FIG. 2 is a schematic diagram of a data storage system of FIG. 1.

Referring now to FIG. 2, shown is an example of an embodiment of the data storage system 12 that may be included in the computer system 10 of FIG. 1. Included in the data storage system 12 of FIG. 2 are Symmetrix® storage systems 20a-20n as manufactured by EMC Corporation of Hopkinton, Mass. In this particular example, each of the Symmetrix storage systems 20a-20n may be inter-connected (not shown) as well as to the host and data manager systems through any one or more communication connections 31 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix systems. Each of 20a-20n may be resources included in an embodiment of the computer system 10 to provide storage services to, for example, host computer systems and/or the data manager system.

Each of the Symmetrix systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area. Also shown in the storage system 20a is an RA or remote adapter 40, for facilitating communication between data storage systems, such as between two Symmetrix data storage systems.

The system 20a may also include one or more host adapters or directors 21a-21n, also known as Front End Adapters ("FAs"). Each of these FAs may be used to manage communications and data operations between one or more host systems and the global memory.

The particular data storage system as described in this embodiment, such as a Symmetrix system by EMC Corporation or a particular device, such as a disk, should not be construed as a limitation. Other types of commercially available data storage systems, as well as processors and hardware controlling access to these particular devices, may also be included in an embodiment.

Figure 3:
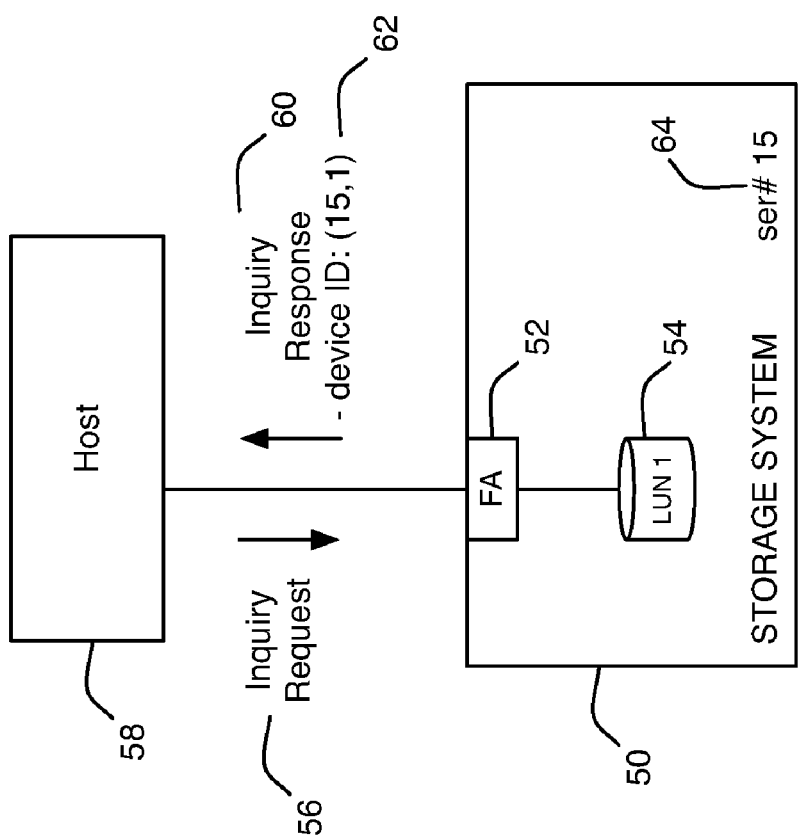
FIG. 3 is a schematic diagram of a computing system including a logical depiction of a storage system and a logical depiction of an inquiry request/response transaction between a host and a storage system.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (also referred to LUNs (logical units)). The LUNs may or may not correspond to the actual disk drives. For example, one or more LUNs may reside on a single physical disk drive. Data in a single storage system may be accessed by multiple hosts allowing the hosts to share the data residing therein. The FAs may be used in connection with communications between a Symmetrix data storage system and a host system. The DAs may be used in connection with facilitating communications to the associated disk drive(s) and LUN(s) residing thereon. For simplicity of description in the following paragraphs, data storage systems will be depicted in terms of the few logical functions visible to hosts as shown in FIG. 3, wherein a storage system 50 includes an FA 52 coupled to a LUN 54.

All storage devices in a storage system must be uniquely identifiable to hosts. For instance, a storage device must respond to a host "inquiry request" SCSI command with an appropriate "inquiry response" containing a device identification number, or device ID. For example, in the simple case of a host directly connected to a disk drive (e.g. a PC connected to its internal disk), upon receipt of an inquiry request, the disk typically returns a (maximum) 16 byte identifier derived from its serial number as its device ID in its inquiry response.

However, in storage systems implementing logical volumes like Symmetrix, the host does not communicate with the drives themselves; rather, the host communicates with LUNs. As shown in FIG. 3, When a storage system 50 such as Symmetrix receives an inquiry request 56 from a host 58, it returns in the inquiry response 60 a device ID 62 derived, from the Symmetrix storage system serial number 64 (herein shown as 15) and the LUN number of the storage device 54 (herein shown as 1).

Once a host is communicating with a LUN, it is imperative that the LUN's device ID not be changed in order that communications between the OS and applications and the LUN can continue uninterrupted.

Figure 4:
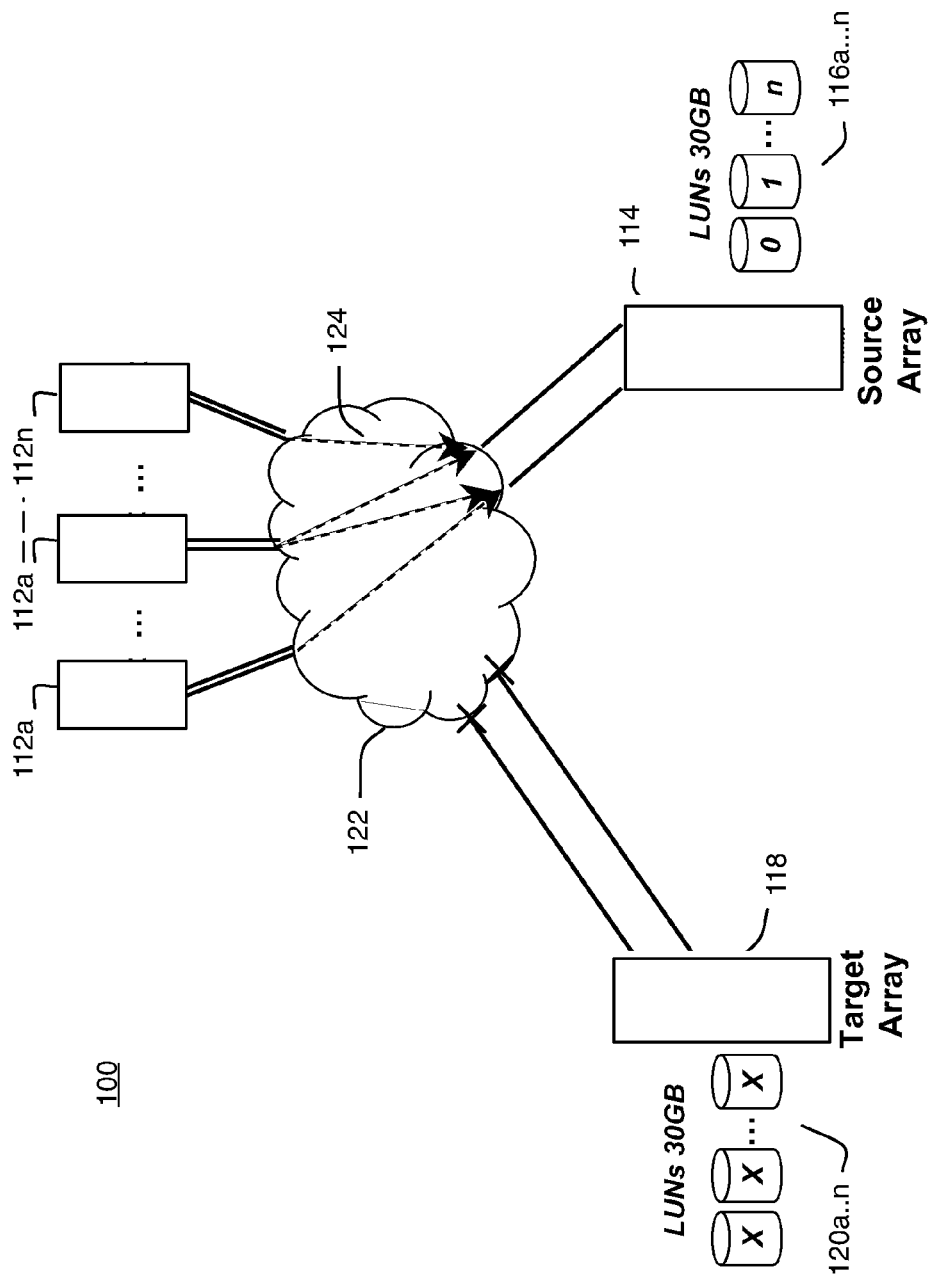
FIG. 4 is a schematic diagram of a computing system wherein a host is coupled to source and target data storage arrays prior to a data migration from source storage devices on the source array to target storage devices on the target array.
Figure 5:
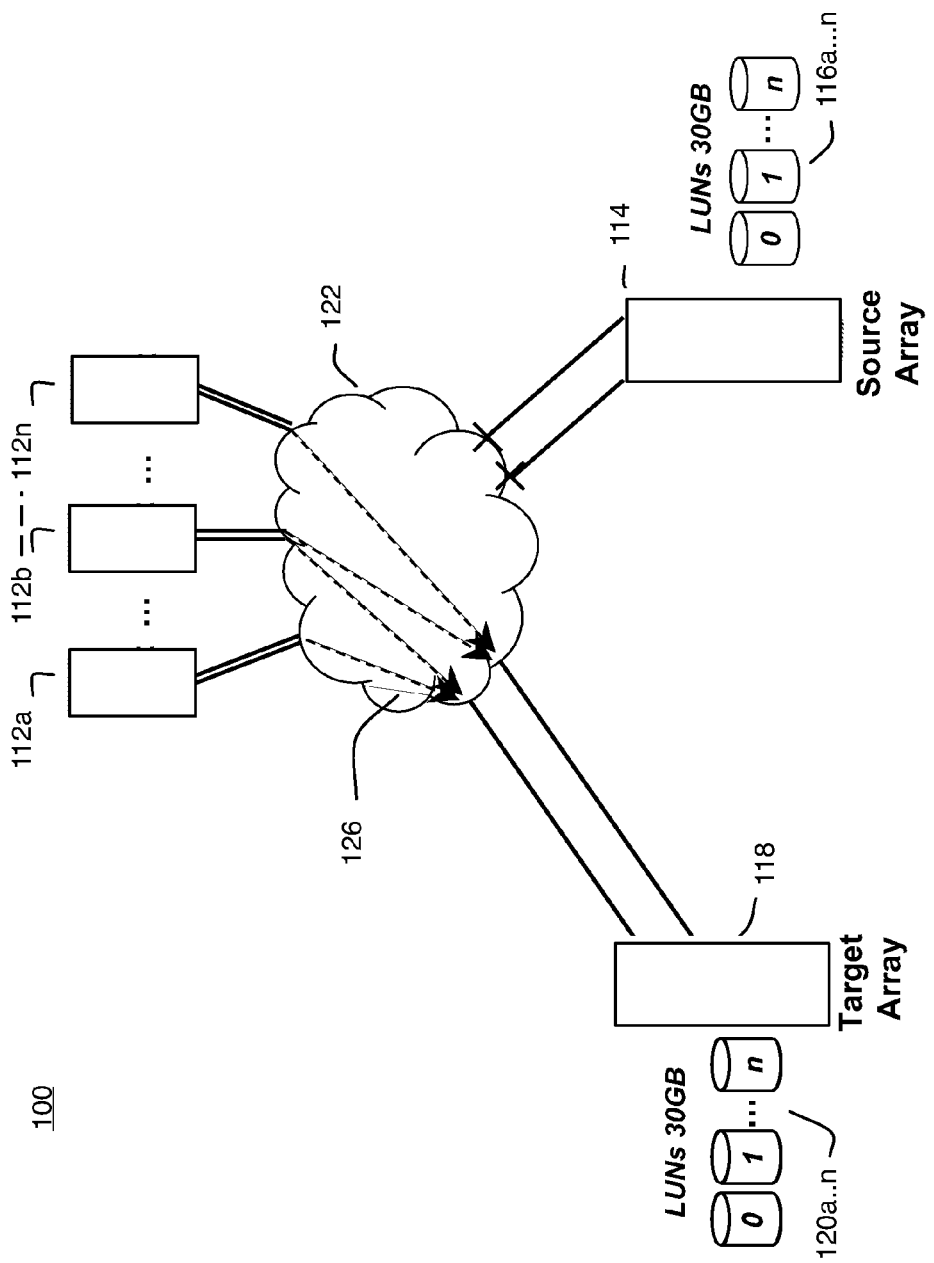
FIG. 5 is a schematic diagram of a computing system wherein a host is coupled to source and target data storage arrays after to a data migration from source storage devices on the source array to target storage devices on the target array.

Referring now to FIG. 4, there is shown a computing system 100, which is a version of the computing system 10 of FIG. 1. The computing system 100 is one example of a system of the type where on-line device migration can be performed in accordance with the invention. Shown are hosts 112a . . . n, a source system shown as a storage array 114 including source storage devices 116a . . . n, and a target storage system shown as a target array 118 including target storage devices 120a . . . n. The hosts 112 and storage arrays 114 and 118 are interconnected by a communications medium 122 of any of the types as previously described with regard to the communications medium 18 of FIG. 1. Initially, the hosts 112 are coupled to the source storage devices 116 in the source storage array 114, and the target array 118 is disconnected from the communications medium 118 as shown by "X". The goal, as shown in FIG. 5, is to migrate the host connections 124 (FIG. 4) and data from the source devices 116a . . . n on the source array 114 over to host connections 126 to the target storage devices 120a . . . n on the target array 118 in a non-disruptive manner, so that the hosts 112a . . . n remain on-line and all applications running on the hosts 112a . . . n continue to run uninterrupted, such that the target devices 120a . . . n "instantly" appear to have become the source devices 116a . . . n.

In order to perform this on-line non-disruptive device migration, three things must happen: 1) the device IDs returned by the devices 120a . . . n in the target array 118 must be the same as those of the device IDs of the devices 116a . . . n in the source array 114 so that the OS and applications on the hosts 112a . . . n can continue to run uninterrupted; 2) the host link connections 124 (FIG. 4) must be moved from the devices 116a . . . n on the source array 114 over to new link connections 126 to the storage devices 120a . . . n on the target array 118; and 3) the data on the devices 116a . . . n must be copied practically instantaneously from the viewpoint of the host OS and applications onto the devices 120a . . . n on the target array 118.

In order to perform the on-line non-disruptive device migration in accordance with the invention, a few applications are utilized. First of all, the hosts are able to access the migration device(s) via multiple I/O paths. Multipathing I/O software is utilized for this purpose. Secondly, on-line data migration software (or sometimes hardware) is utilized to copy data from the source device(s) to the target device(s). Multipath I/O and on-line data migration software are described in further detail below in order to further aid understanding of the embodiments of the invention.

Multipath I/O

Multipathing is the ability to implement multiple I/O paths from a server to a storage array. Multipathing provides protection against hardware failures (e.g. cable cuts, switch failures, HBA failures, etc. . . . ) and can provide higher performance by utilizing the aggregate performance of multiple connections. When one path or connection becomes unavailable the multipathing software automatically shifts the load to one of the other available paths.

Multipathing can be considered as split into two categories, active-active and active-passive. A multipathing solution is generally considered to be active-active when I/O for a single LUN is going down multiple paths. Symmetrix multipathing has traditionally been active-active.

A multipathing solution is generally considered to be active-passive when a single path is used, and other, passive paths, are only used when the active path is not available.

In accordance with the SCSI standard <www.t10.org>, a particular type of active-passive path is specified. The active path responds to administrative requests such as inquiry requests and all read and write I/Os. The passive path responds to administrative requests such as inquiry requests, but in response to read or write I/Os, the passive path returns a check condition indicating that it is passive and cannot complete the I/Os. Thus, when a host attempts an I/O read or write on a passive path, it receives a check condition in return, and then must re-try the I/O read or write on an active path.

MPIO software is available from many vendors. In the preferred embodiments, the MPIO software used is PowerPath® from EMC Corporation. Referring to FIG. 6 there is shown an example of how PowerPath MPIO software operates. A host 212 is shown having MPIO software 214 installed thereon. The MPIO software 214 is a layer of software that resides between the host ports 216, herein shown as host bus adapters (HBAs) 216*a*, 216*b*, 216*c*, and the OS 220 and applications 222. The HBAs 216*a, b, c*, are coupled to corresponding Front End Adapters FA 224*a*, 224*b*, and 224*c* on a storage array 226 via paths A, B and C respectively. Multiple logical paths are configured between the FAs 224*a* . . . *c* and storage devices 228*a*, 228*b*, 228*c* in the storage array 226 as shown.

The MPIO software is able to ascertain that devices are available on multiple paths by sending inquiry requests and examining the inquiry responses it receives. The MPIO software keeps track of the inquiry response information in a table or similar structure such as that shown in FIG. 7. When the host sends an inquiry request to the device 228*a* "LUN1", it receives an inquiry response via with HBAs 216*a*, 216*b*, and 216*c*. Therefore, the MPIO software knows that it can reach device "LUN1" on 3 different paths. Likewise, when the host sends an inquiry request to the device "LUN2", it receives an inquiry response via HBAs 216*b* and *c*. When the host sends an inquiry request to the device "LUN3", it receives an inquiry response on HBA 216*c*. Generally, the MPIO software knows a device, e.g. LUN1, 2, or 3, is available on more than one path because it receives the same inquiry response information from more than one HBA.

Online Data Migration Software

Online data migration software is used to copy data from a source storage device to a target device while the source storage device remains on-line. Many online data migration software solutions exist. One such solution is called Open Replicator for Symmetrix ("ORS") from EMC Corporation. EMC data migration software is fully described in U.S. Pat. No. 5,680,640, "System for Migrating Data by Selecting a First or Second Transfer Means Based on the Status of a Data Element Map Initialized to a Predetermined State", incorporated fully herein by reference. There are several different types of ORS sessions. During a "hot pull" session, the host(s) coupled to the source storage device remains on-line and applications on the host continue to execute during the data migration. Data is pulled from the source Symmetrix device to the target Symmetrix device as needed. Metadata is used to keep track of the status of the data on the source and target Symmetrix devices—e.g. whether the data is valid, whether it must be pulled from the source Symmetrix, whether it is about to be newly written and therefore should not be pulled, etc.

An ORS hot pull session is established by first "defining" the session. To set a hot pull session, all the necessary steps are taken to prepare target storage device for copying the data from the source storage device to the target storage device. The hot pull session is then ready to be activated as required.

There are also hardware data migration appliances for aiding data migration. These boxes use I/O ports or network ports on the storage systems to connect the source and target storage arrays via a hardware device to transfer the data between the source and target storage devices. Though the preferred embodiments utilize data migration software, it is understood that any data migration tools, including hardware migration appliances, can be employed without departing from the principles of the invention.

On-Line Device Migration

The on-line non-disruptive data migration solution in accordance with the invention is now described with reference to FIGS. 8-25. In these Figures, the invention is described as it is implemented between one host, one source storage device in one source storage array, and one target storage device in one target storage array. It will then be clear to those skilled in the art how to implement the invention in order to perform a non-disruptive data migration in a multi-host system wherein the source and target arrays include multiple devices to be migrated, as shown in FIGS. 4-5.

The general method of the invention is first described with reference to FIGS. 8-9. The invention is then described with reference to FIGS. 10-18 as it is employed in a first embodiment wherein a host is coupled (logically) directly to the source and target arrays. The invention is then described with reference to FIGS. 19-25 as it is employed in a second embodiment wherein the host is coupled to the source and target arrays via a SAN including a fabric switch.

General Method of the Invention

Figure 8:
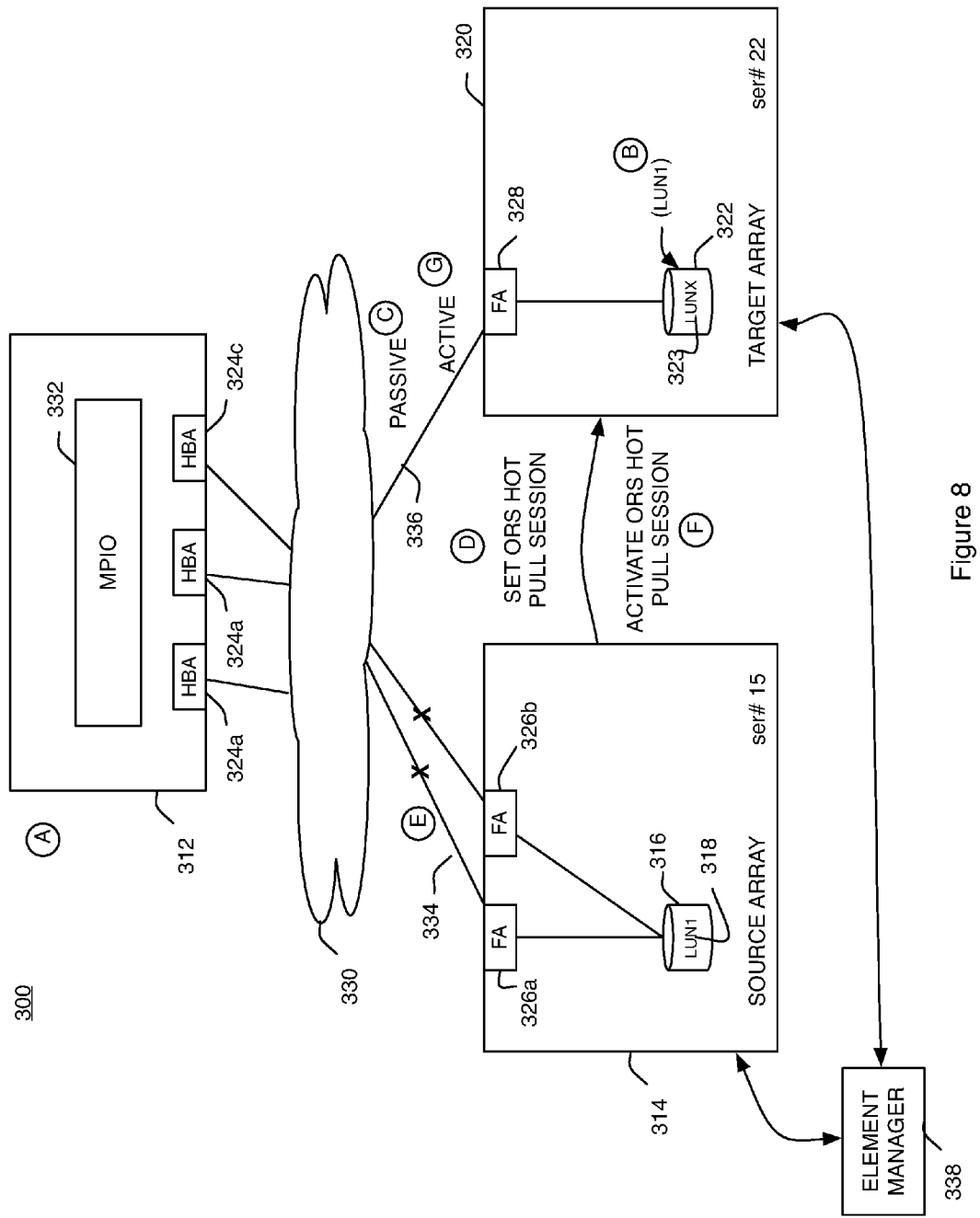
FIG. 8 is a schematic diagram of a computing system employing the general non-disruptive data migration mechanism of the invention.
Figure 9:
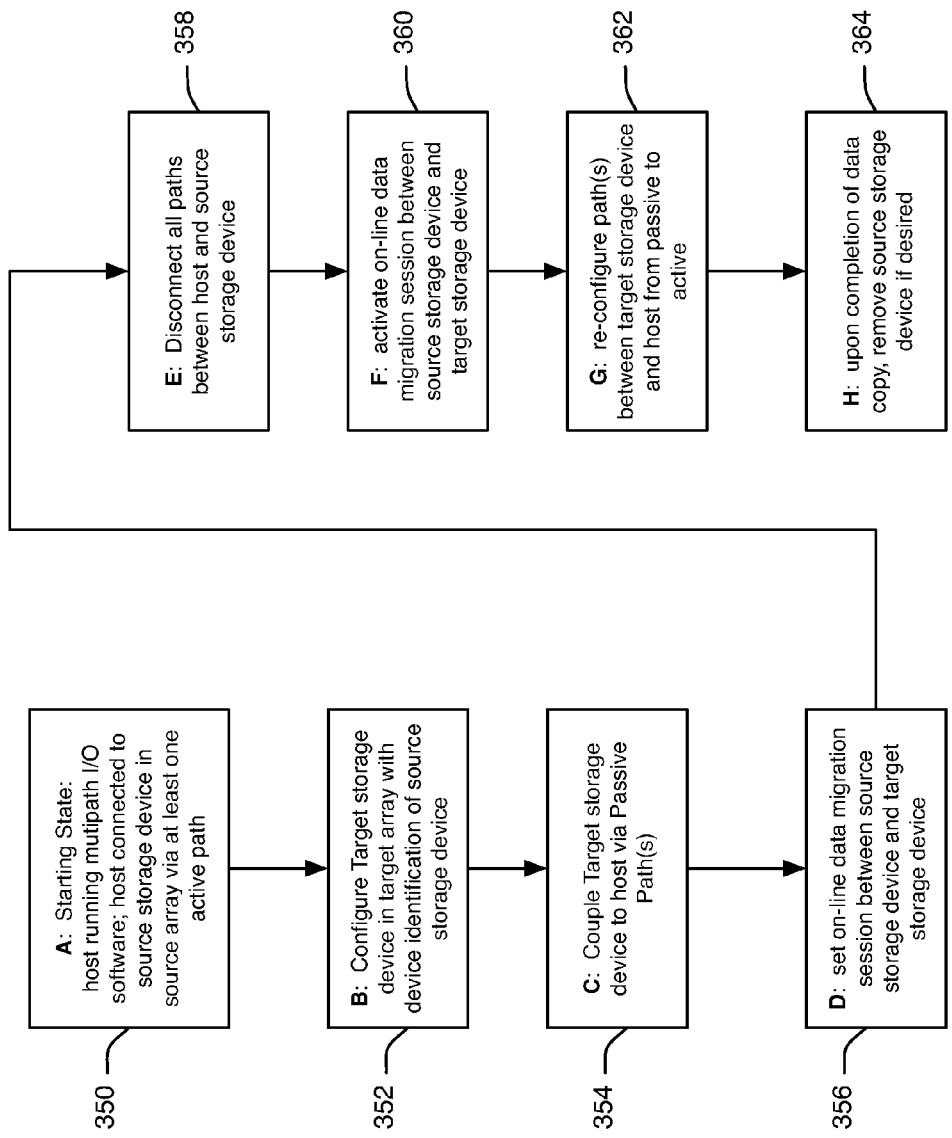
FIG. 9 is a flow diagram of the operation the general non-disruptive data migration mechanism of the invention between a host, a source storage device, and a target storage device.

In FIG. 8, there is shown a computing system 300 employing the method of the invention as shown in FIG. 9. The system 300 includes a host 312, a source array 314 including a source storage device 316 having device ID 318, and a target storage array 320 including a target storage device 322 having target storage device ID 323. The host 312 includes host ports, or HBAs, 324*a,b,c*. The source array 314 includes source array ports, or FAs, 326*a,b*. The target array includes target array port, or FA, 328. Host HBAs 324*a,b,c*, FAs 326*a,b*, and FA 328 may be interconnected via interconnect 330 in any manner as previously described with regard to the communications medium 18 of FIG. 1. The host 312 runs MPIO software 332. An element manager 338 is shown coupled to the source and target arrays 314 and 320. The goal is to migrate the data from the source storage device 316 to the target storage device 322 in a manner that is non-disruptive to the host 312 and the OS and applications running thereon.

The general method of the on-line non-disruptive data migration solution in accordance with the invention is shown in FIG. 9, with reference to FIG. 8. Corresponding steps in FIG. 9 and system configurations in FIG. 8 are labeled "A"-"G". The method may be carried out by the element manager 338 of FIG. 8. In step 350, the computing system 300 should be in its starting state. Accordingly, the host 312 is running multipath I/O software 332. The host 312 is coupled to the source storage device 316 via at least one active path such as 334. ('A'). Next, in step 352, the target storage device 322 in the target array 320 is configured with the same device ID ("LUN1") as the source storage device ('B'). Then, in step 354, the target storage device is coupled to the host via one or more passive paths 336 ('C'). In this example, one passive path is shown for ease of understanding. The passive path allows the target storage device 322 to return its device ID to the host 312, but the target storage device 322 will not complete I/O read and write requests from the host 312. Next, in step 356, an on-line data migration session is set (but not activated) between the source storage device 316 and the target storage device 322 ('D'). Next, in step 358, all paths between the host 312 and the source storage device 316 are then disconnected ('E'). Then, in step 360, the on-line data migration session between the source storage device 316 and the target storage device 322 is activated ('F'). Now, in step 362, the passive path between the target storage device and the host is re-configured to an active path, and is now responsive to host I/Os ('G'). If desired, upon completion of the data copy, the source storage device can be removed (step 364, 'H'.)

Note that, during steps E and F, the host 312 cannot access the source storage device (15,1) and must retry I/Os until it finds an active path—that is, it must retry I/Os until step G is completed. Every active path that existed and was disabled in step E may cause a host I/O retry until an active path is established in step G. That is, the number of paths that existed affects the number of retries that might occur. Steps E, F, and G, including all retries, need to be completed within the time-out limit of the host OS—generally about 30 seconds—in order that the migration be non-disruptive. In the great majority of cases, this time limit far exceeds the amount of time needed to complete the migration in accordance with the invention.

Embodiment 1

The implementation details of the method of FIG. 9, steps A-G, are now described with reference to an embodiment of the invention wherein the host, source array, and target array are coupled via direct connections.

A. Starting State

Figure 10:
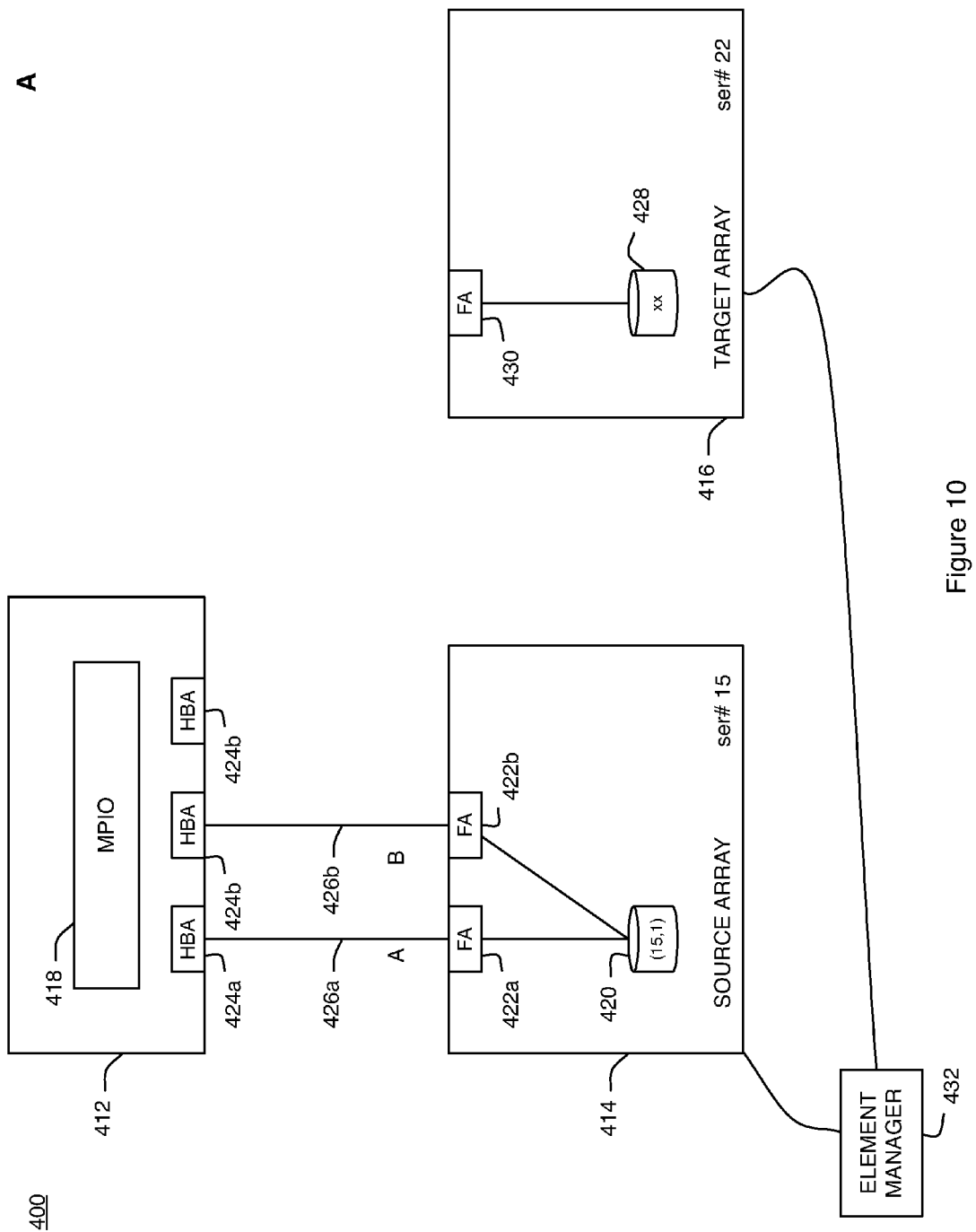
FIG. 10 is a schematic diagram of a computing system employing the non-disruptive data migration mechanism of the invention, wherein a host is directly attached to source and target storage arrays.

Accordingly, as shown in FIG. 10, a computing system 400 includes a host 412, a source storage array 414, and a target storage array 416. Again, in the preferred embodiment shown, the storage systems are Symmetrix storage systems, though it is understood that the invention is not limited to Symmetrix implementations and other storage systems can be used. The host 412 runs MPIO software 418—in this example, PowerPath software. The host 412 is initially coupled to the source storage array 414.

The source array 414 includes a source storage device 420 accessible via two FAs 422a, 422b. The host 412 includes host ports, or HBAs, 424a and 424b. The MPIO software 418 recognizes the connections 426a, 426b as multiple active paths A, B between the host ports 424a,b and FAs 422a,b respectively. In particular, the source array serial number is shown as 15; thus, the device ID for the source device 420, derived from the array serial number and device number, is shown as (15,1). In response to a host inquiry request, the MPIO software 418 receives an inquiry response from device ID (15,1) via both HBA 424a and HBA 424b. The MPIO software thus knows it has two paths to the storage device with device ID (15,1). It is noted that in the preferred embodiments wherein the arrays are Symmetrix arrays, device IDs are derived in part from Symmetrix serial numbers. But it is understood that arrays from other vendors will include devices whose device IDs are derived in other manners. The manner in which a device ID is derived is not material to the invention; thus, arrays from many different vendors can be employed in a computer system such as that of FIG. 10 without departing from the principles of the invention.

The target array 416 is shown with a serial number of 22, and includes a target storage device 428. The target storage device 428 is coupled to an FA 430. The target array is not yet coupled to the host 412.

In accordance with the invention, an element manager 432 is coupled to source and target arrays 414 and 416. The element manager is a logical control entity that may be implemented separately or on the host 412.

B. Device ID Spoofing

Figure 11:
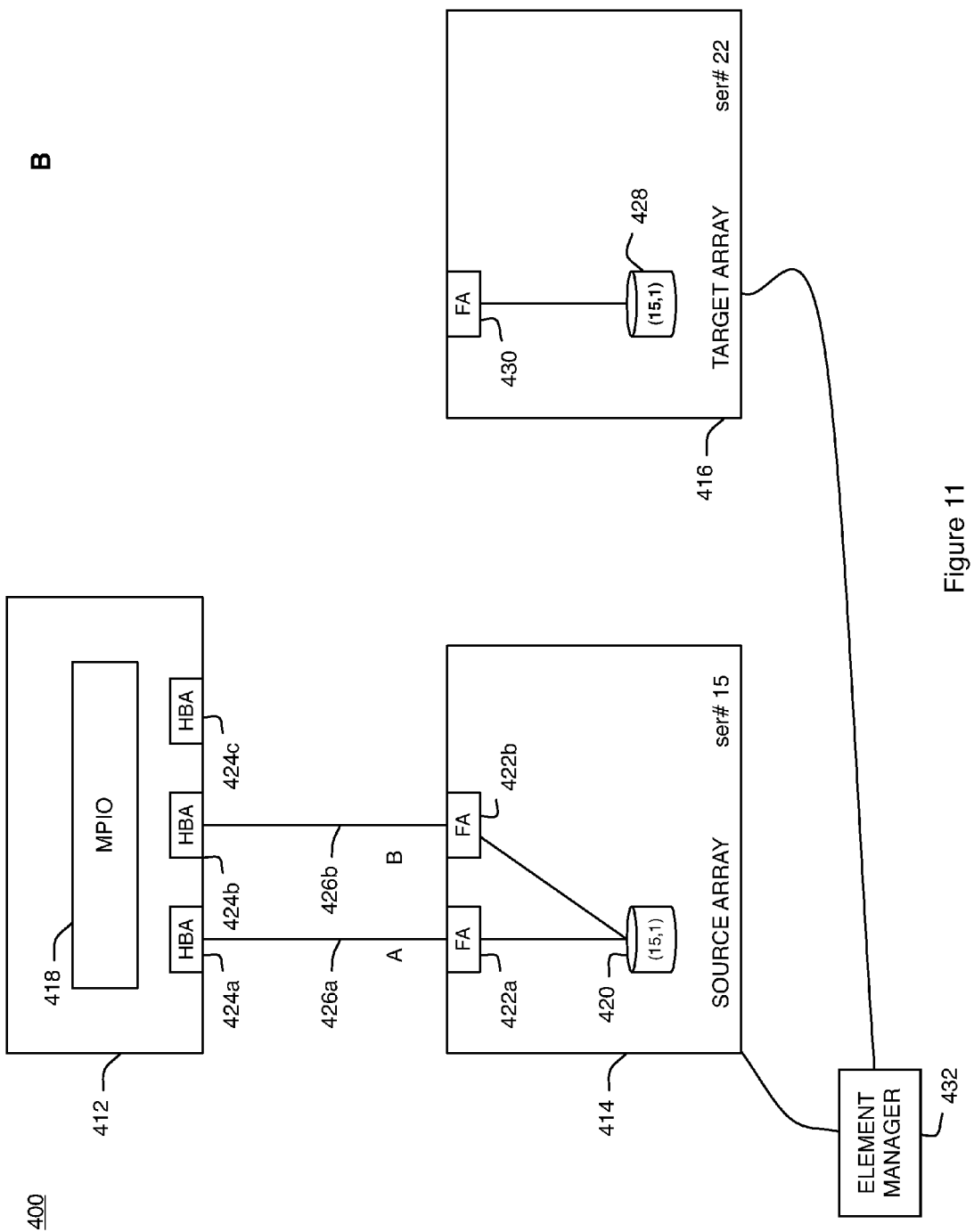
FIG. 11 is a schematic diagram of FIG. 10 wherein the target device is assigned the device ID of the source device in accordance with the invention.

Referring to FIG. 11, in order for the host 412 to eventually recognize the target storage device 428 as the source storage device 420, the target device 428 will need to have the same device ID as the source device 420. In order to achieve this, the element manager 432 is coupled to the source array 414 and target array 416. The element manager 432 learns the device IDs and other configuration information for the source device 420 on the source array 414. Before a connection is enabled between the FA 430 and any host port, the element manager 432 assigns to the target device 428 the device ID (15,1) of the source device 420 in the source array 414. Now the device IDs of the source and target devices 420 and 428 are exactly the same.

Alternatively, the device ID of the source device 420 may be obtained manually, and then assigned to the target device 428 manually, rather than learned by the element manager 432. Thus, the element manager is not required in order to assign the source device 420 device ID to the target device 428.

C. Connect Target Device

Figure 12:
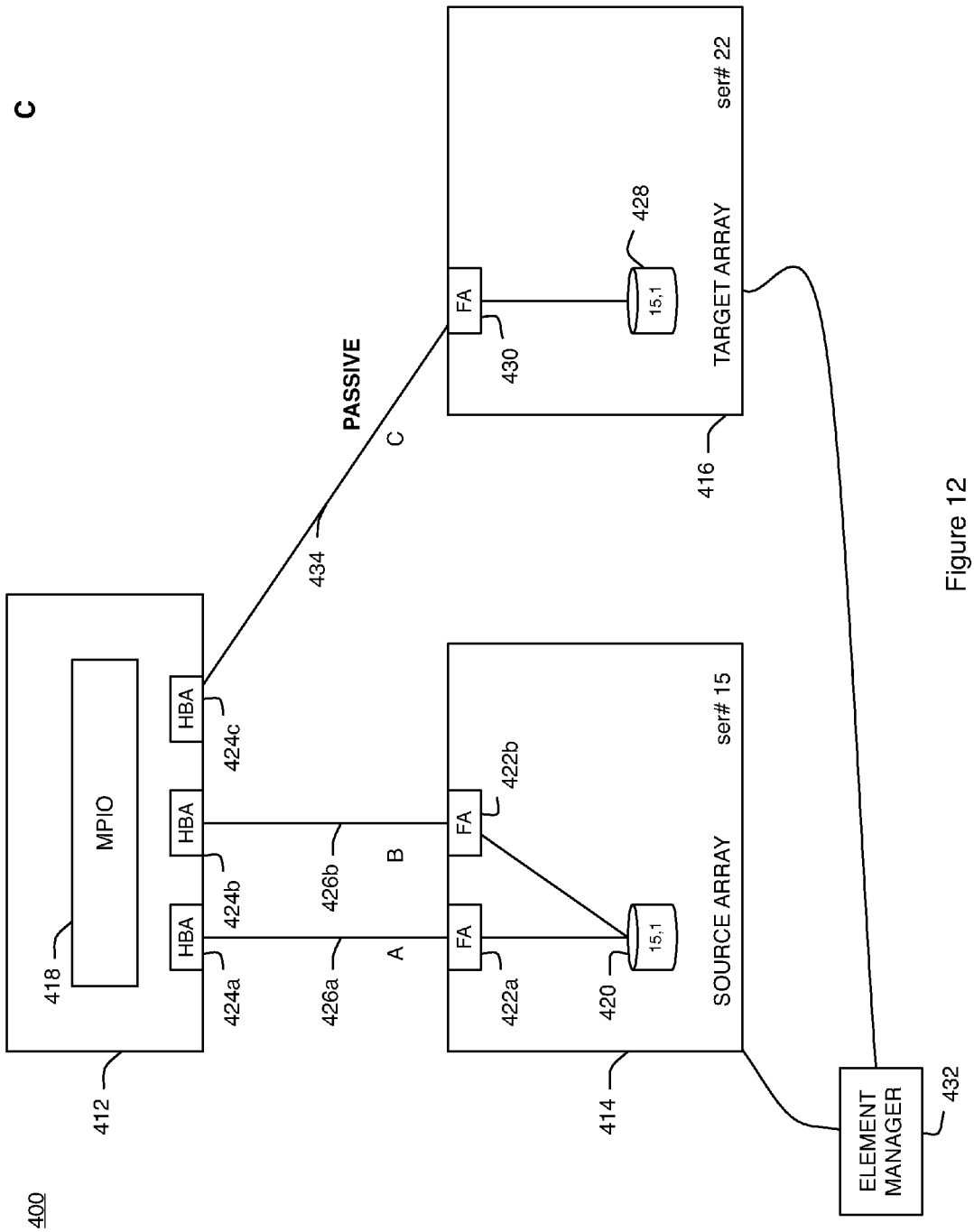
FIG. 12 is a schematic diagram of FIG. 10 wherein a passive connection is established between the target device and host in accordance with the invention.

Next, referring to FIG. 12, a new path is added to connect the target device 428 to the host 412. In this embodiment, this is accomplished by connecting a third host port, HBA 424c, on the host 412 to the FA 430 on the target array 416. Now, when the host 412 issues an inquiry request, the MPIO software 418 will notice that an inquiry response is received from a device (15,1) on paths A, B, and C on HBAs 424a, b, and c respectively. It appears to the MPIO software 418 that a single device, (15,1), is available on the same storage array via three different paths.

However, in accordance with the invention, when the path between the target device 428 on the target array 416 and the host 412 is established, it is established in a passive mode. Thus, inquiry commands from the host can be responded to via this path. But, I/O reads and writes will be responded to with a check condition indicating that they cannot be completed. These I/Os will be retried via one of the other, active paths (A, B) to the device 420, where the application data still resides. This is a stable state.

Figure 13:
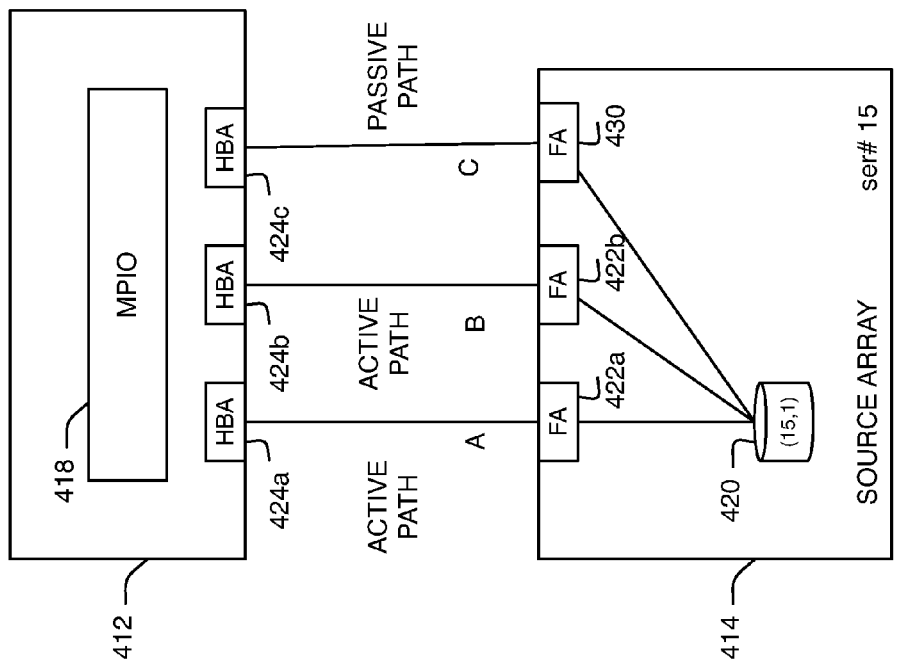
FIG. 13 is a schematic diagram of a computing system that is logically equivalent to that of FIG. 12.

In FIG. 13, there is shown the logical equivalent of this stable state. It appears to the MPIO software 418 on the host 412 that it is coupled to a single logical device (15.1) via three paths A, B and C, wherein A and B are active paths and C is a passive path.

It is noted that more than one passive path can be added between the target device 428 and the host 412, and in fact this may be desirable for fault tolerance. One passive path has been shown for simplicity of description.

D. Prepare Data Migration Session

Figure 14:
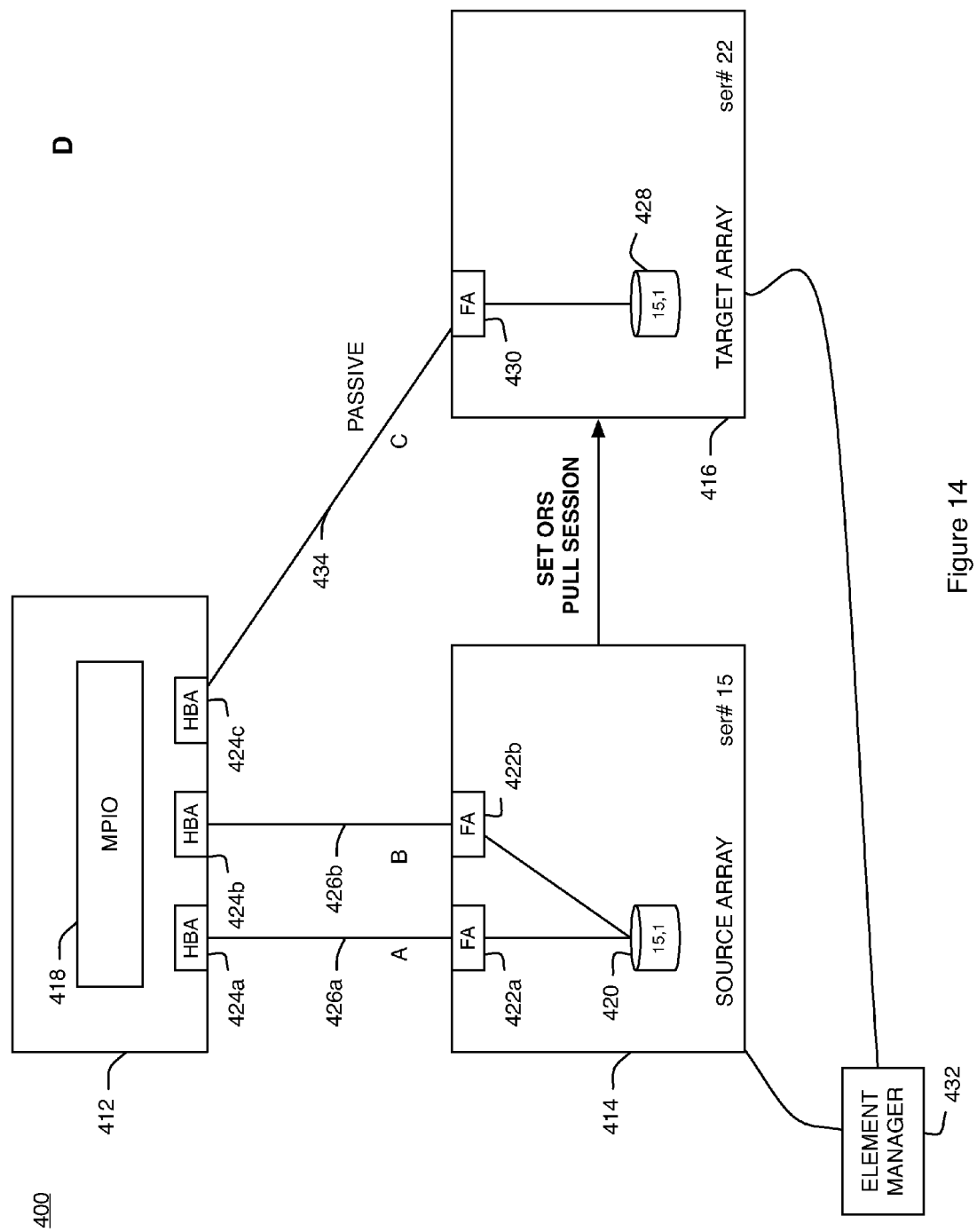
FIG. 14 is a schematic diagram of FIG. 10 wherein the data migration session between the source and target storage device is prepared in accordance with the invention.

Referring now to FIG. 14, the element manager 432 now employs an on-line data migration application to copy the data from the source device 420 on the source array 414 to the target device 428 on the target array 416. In the preferred embodiment, the on-line migration application is ORS. An ORS hot-pull session is defined such that it is prepared to begin copying data. By setting the session now, relatively time consuming activities are taken care of so that the hot-pull session can be quickly activated.

E. Disable Paths to Source Device

Figure 15:
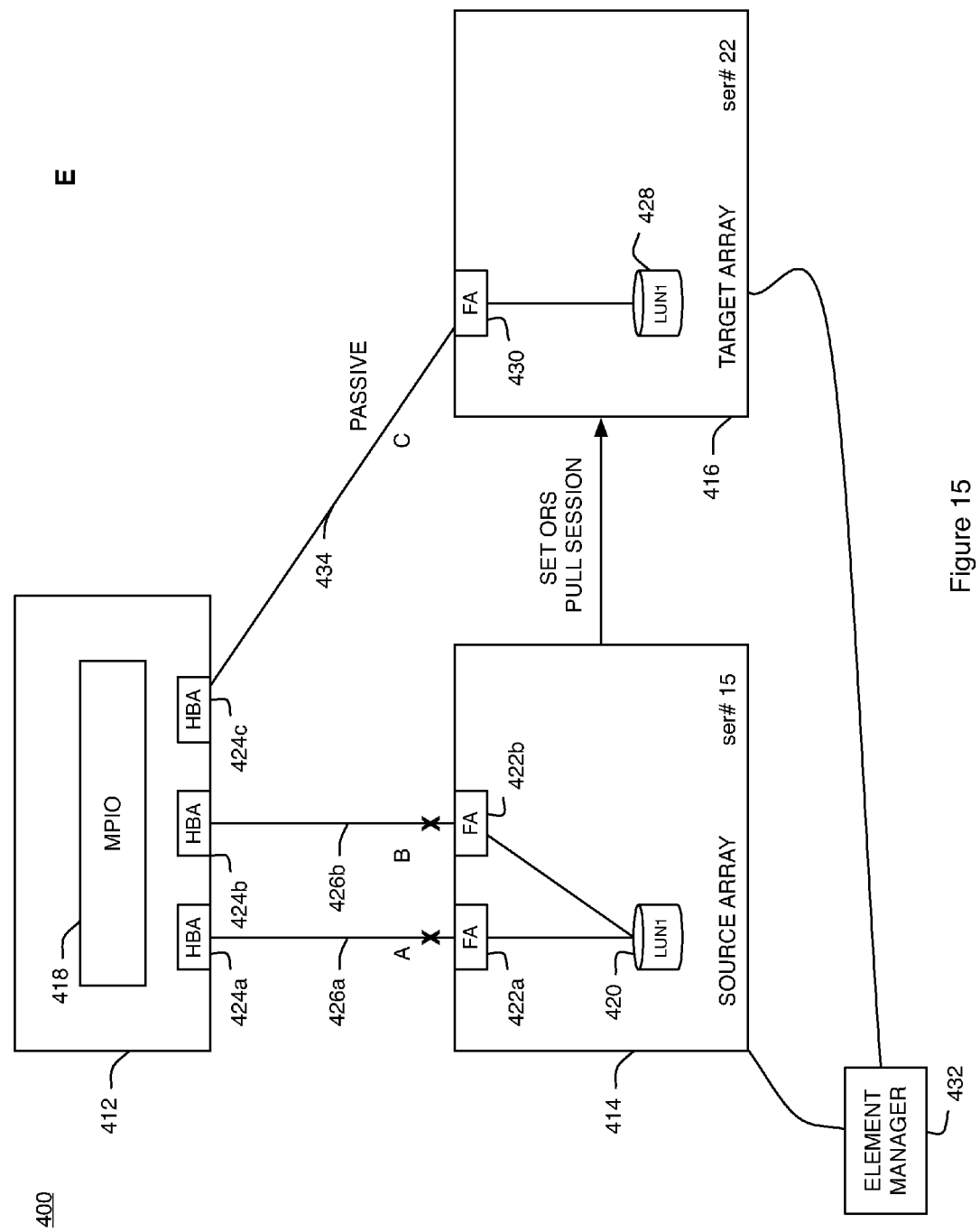
FIG. 15 is a schematic diagram of FIG. 10 wherein the connections to the source storage device are disabled in accordance with the invention.

Referring to FIG. 15, after the on-line migration application is set, the paths from the host 412 to the source device 420 on the source array x are disabled (denoted by "X" on paths A and B). The element manager 432 accomplishes this by disabling the FA ports 422a and 422b on the source array 414.

At this point, the host 412 cannot contact the device with device ID (15,1) via paths A, B at all. The host 412 can perform inquiry requests to a device with device ID (15,1) via path C, but cannot complete read or write I/Os. Now, any read or write I/Os issued by the host 412 are being re-tried.

F. Activate Migration Session

Figure 16:
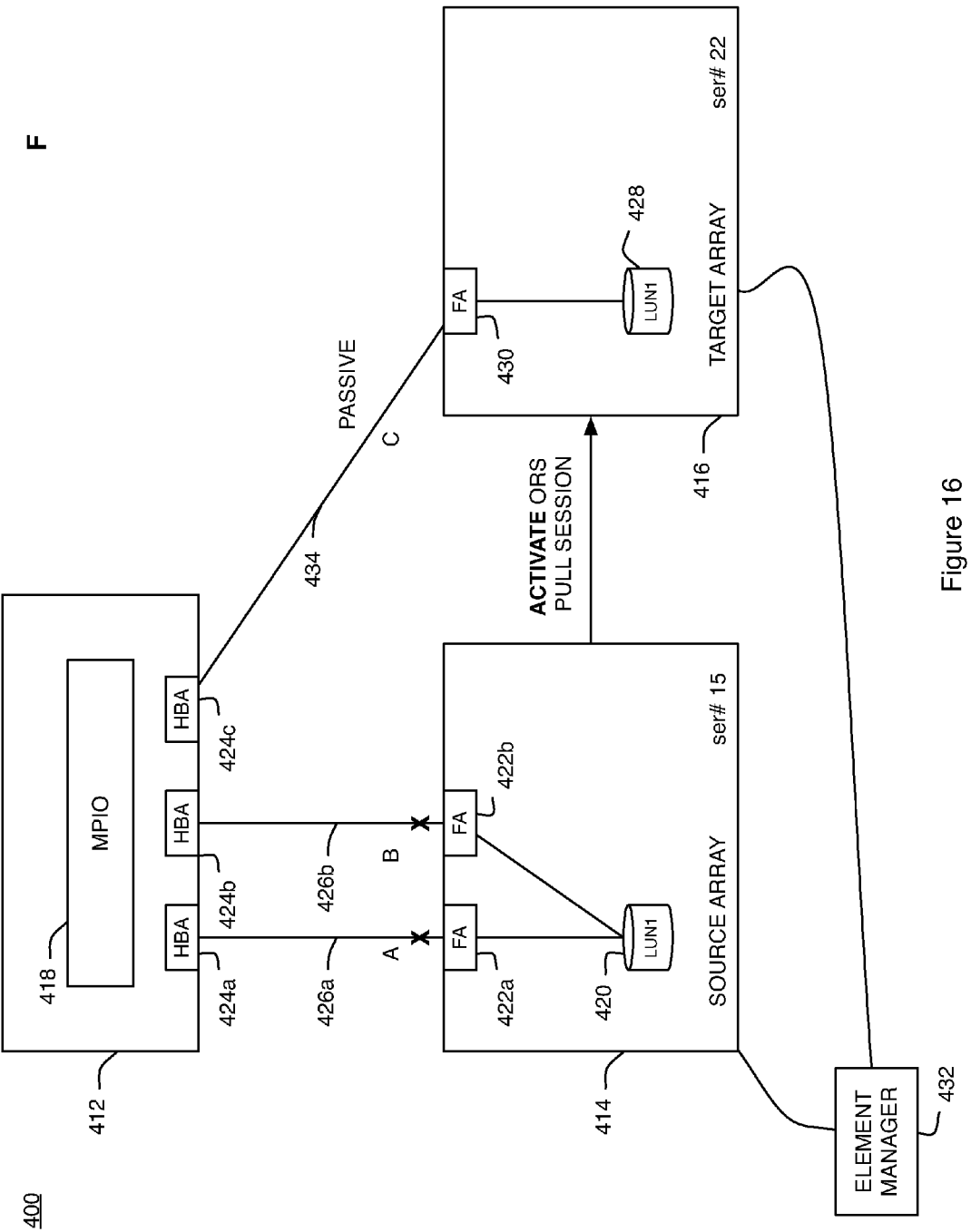
FIG. 16 is a schematic diagram of FIG. 10 wherein the data migration session between the source and target storage device is activated in accordance with the invention.

Referring to FIG. 16, after the paths to the source device 420 have been disabled, the on-line migration application session is activated. In this example, the ORS data migration session is activated by the element manager 432.

Figure 17:
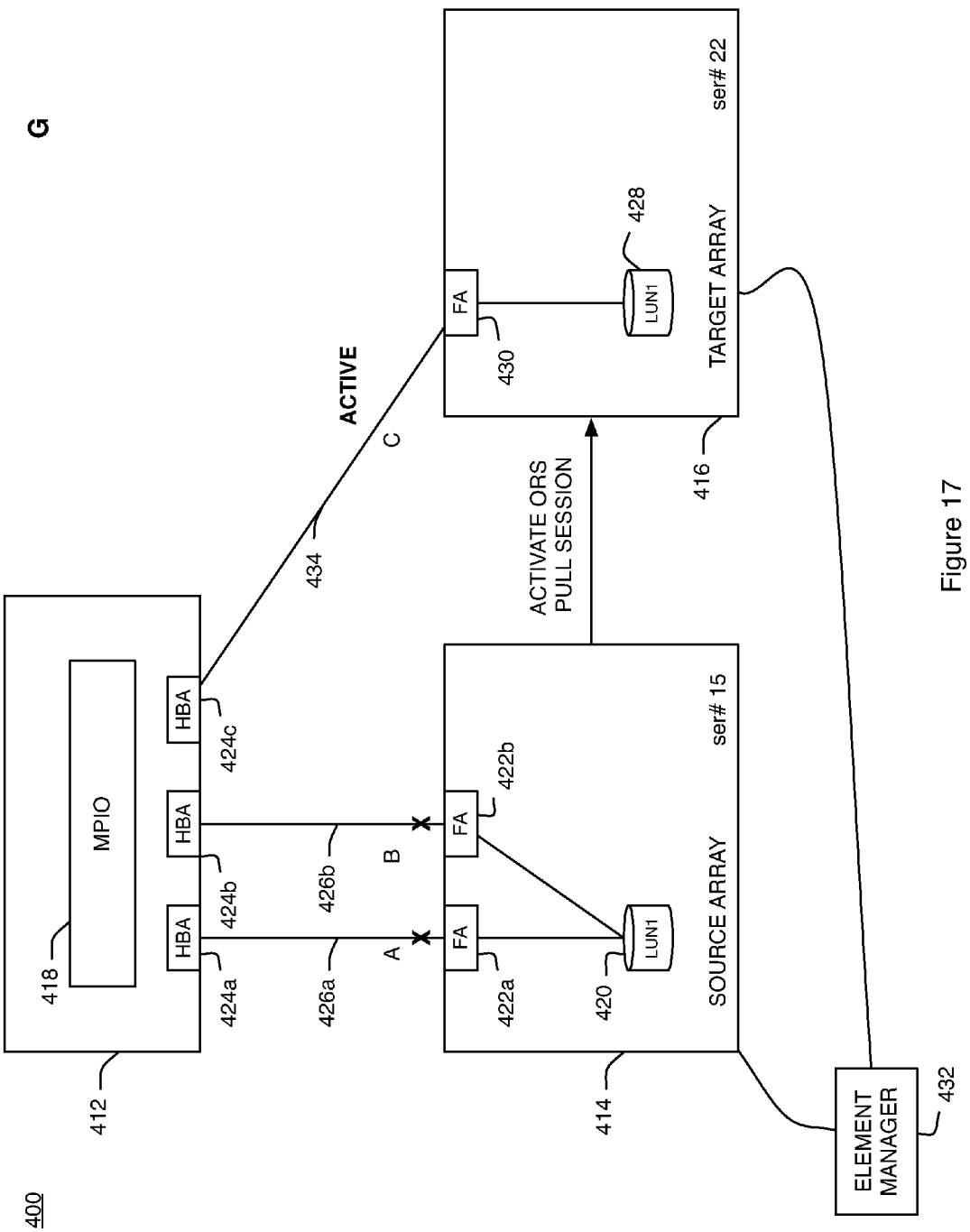
FIG. 17 is a schematic diagram of FIG. 10 wherein the passive connection between the host and target storage device is activated in accordance with the invention.
Figure 18:
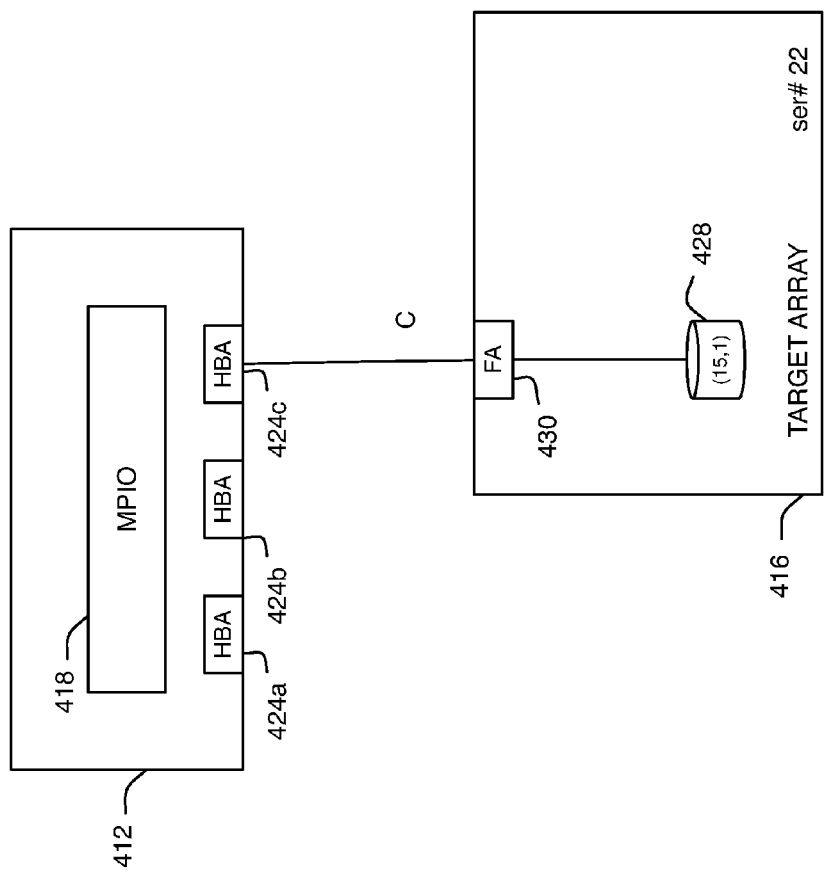
FIG. 18 is a schematic diagram of FIG. 10 wherein the data migration from the source device to the target device is complete and the source array has been removed.

G. Re-Configure Paths Between Target Device and Host from Passive to Active Mode Now, as shown in FIG. 17, the passive path(s) between the target device 428 on the target storage system 416 and the host 412 is switched from passive mode to active mode. Thus, I/O read and write requests from the host 412 to the device ID (15,1) via path C will now be completed. Since the ORS hot-pull session is running, any data not yet present on the target device 428 will be pulled from the source device 420 as needed. Once all data has been copied from the source device 420 to the target device 428, the source device 420 can be removed (FIG. 18).

Note that, during steps 4 and 5, the host cannot access the device (15,1) and must retry I/Os until it finds an active path—that is, it must retry I/Os until step 6 is completed. Every active path that existed and was disabled in step 4 may cause a host I/O retry until an active path is established in step 6. That is, the number of paths that existed affects the number of retries that might occur. Steps 4, 5, and 6, including all retries, need to be completed within the time-out limit of the host OS—generally about 30 seconds—in order that the migration be non-disruptive. In the great majority of cases, this time limit far exceeds the amount of time needed to complete the migration in accordance with the invention.

Embodiment 2

The implementation details of the method of FIG. 9, steps A-G, are now described with reference to an embodiment of the invention wherein the host, source array, and target array are coupled via a fabric switch.

A. Starting State

Figure 19:
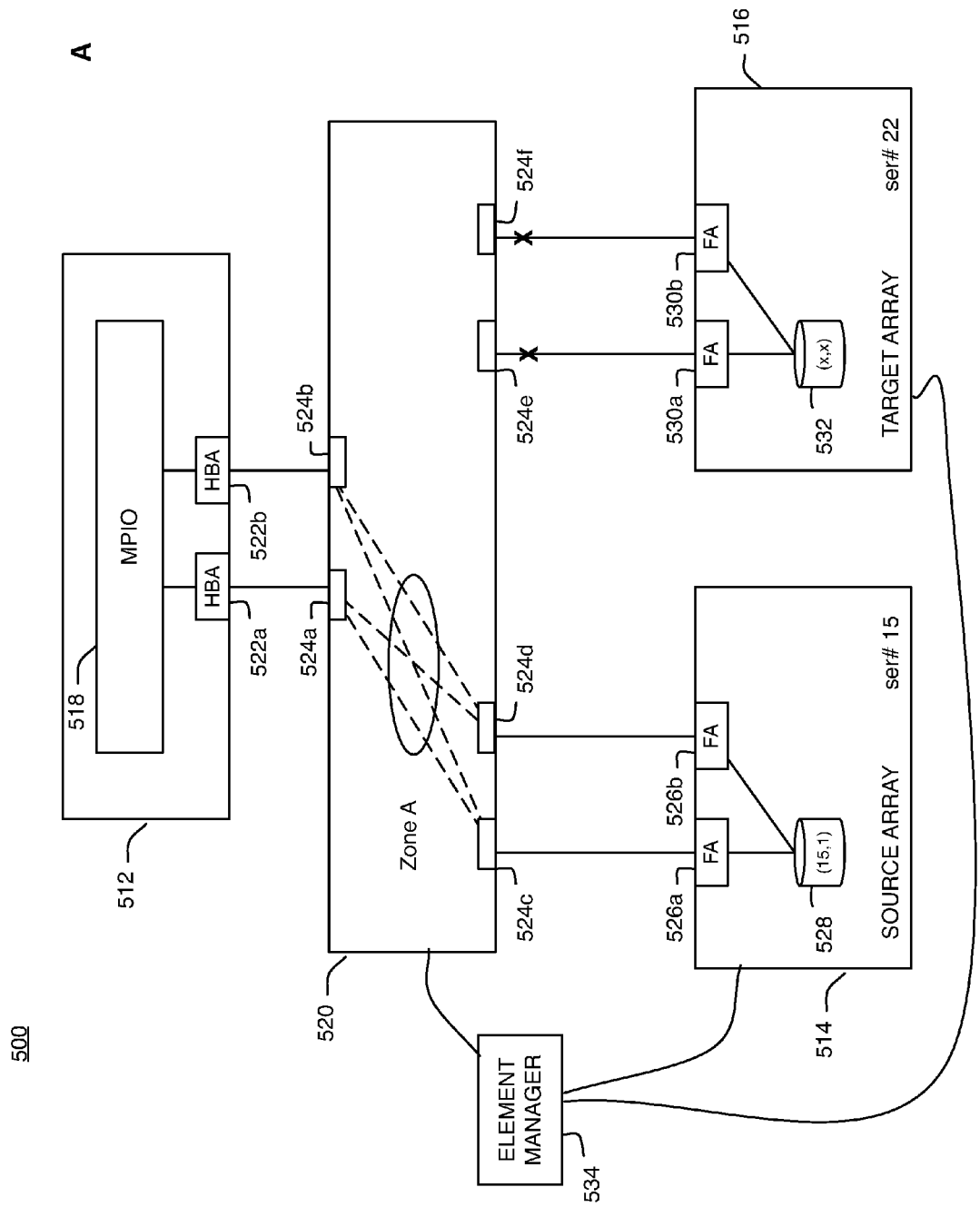
FIG. 19 is a schematic diagram of a computing system employing the non-disruptive data migration mechanism of the invention, wherein a host is attached to source and target storage arrays via a fabric switch.

Accordingly, as shown in FIG. 19, a computing system 500 includes a host 512, a source storage array 514, and a target storage array 516. Again, in the preferred embodiment shown, the storage systems are Symmetrix storage systems, though it is understood that the invention is not limited to Symmetrix implementations and other storage systems can be used. The host 512 runs MPIO software 518—in this example, PowerPath software.

The host 512 is initially coupled to the source storage array 514 via a fabric switch 520. In this embodiment, the fabric switch is a Fibre Channel fabric switch, although other fabrics, such as Ethernet fabrics, can be used. The host 512 includes two host ports, HBA 522a, 522b, each coupled respectively to a switch port 524a, 524b on the switch 520.

The source array 514 includes two FAs 526a, 526b coupled to a source storage device 528. The source array serial number is shown as 15. The source logical device ID is shown to be (15,1). The FAs 526a, 526b are each coupled respectively to switch ports 524c, 524d on the switch 520. The host facing switch ports 524a, b and the source array facing switch ports 524c, d are logically coupled, or zoned, within the switch via "Zone A". The MPIO software 518 recognizes that, in response to an inquiry request, it receives an inquiry response from device ID (15,1) on both HBA 522a and HBA 522b. The MPIO software thus knows it has two active paths to the device (15,1).

The target array 516 includes two FAs 530a, 530b coupled to a target storage device 532. The FAs 530a, 530b are each coupled respectively to switch ports 524e, 524f on the switch 520. Initially (i.e. at step 350) the switch ports 524e, 524f are disabled, as indicated by "X".

In accordance with the invention, an element manager 534 is coupled to the source and target arrays 514 and 516. The element manager 534 is a logical control entity that may be implemented separately or on the host 512.

Again, it is noted that in the preferred embodiments wherein the arrays are Symmetrix arrays, device IDs are derived in part from Symmetrix serial numbers. But it is understood that arrays from other vendors will include devices whose device IDs are derived in other manners. The manner in which a device ID is derived is not material to the invention; thus, arrays from many different vendors can be employed in a computer system such as that of FIG. 19 without departing from the principles of the invention.

B. Device ID Spoofing

Figure 20:
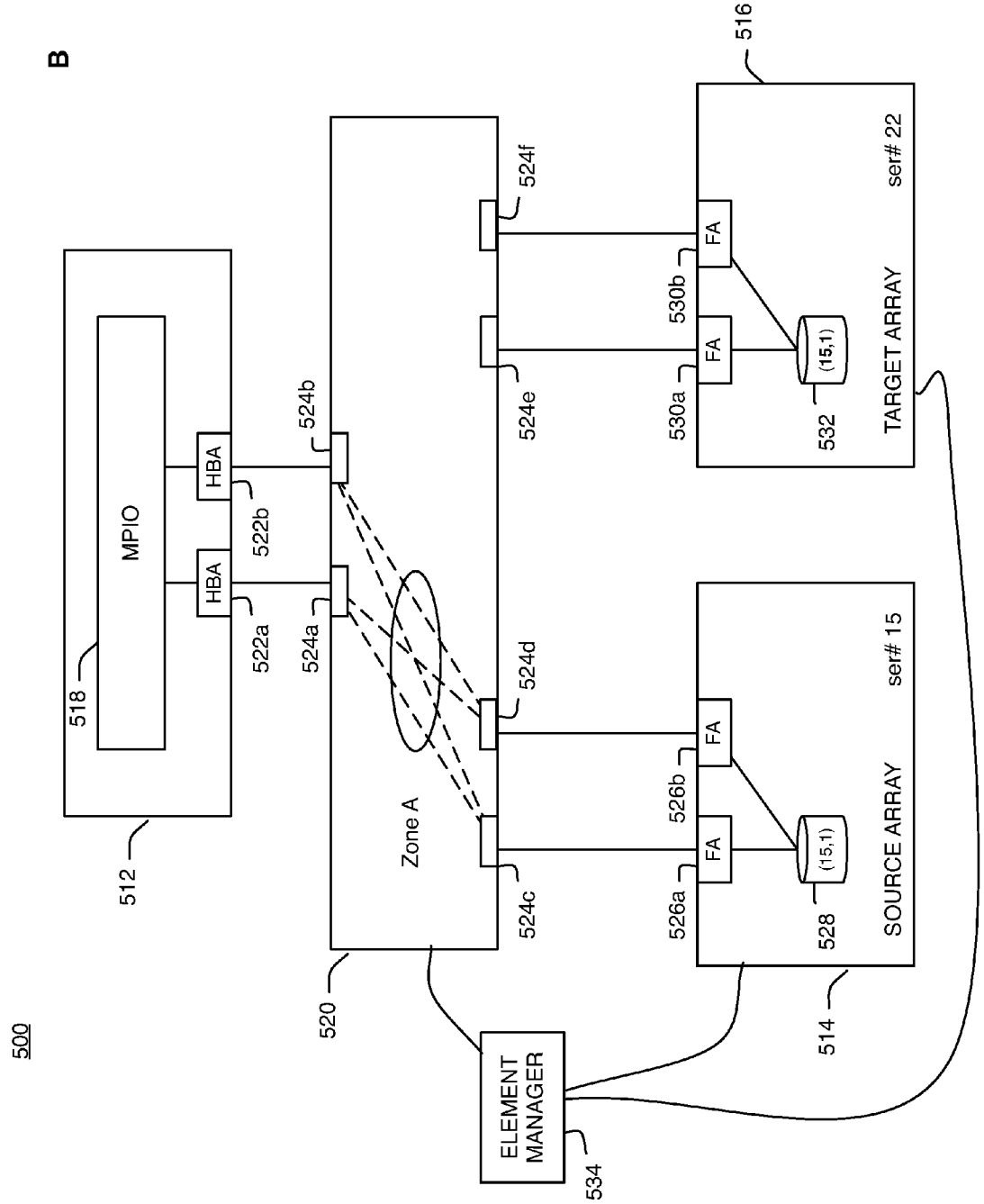
FIG. 20 is a schematic diagram of FIG. 19 wherein the target device is assigned the device ID of the source device in accordance with the invention.

In order for the host 512 to eventually recognize the target device 532 as the source device 528, the target device 532 will need to have the same device ID as the source device 528. In order to achieve this, the element manager 534 is coupled to the source array 514, target array 516, and the switch 520. Referring to FIG. 20, the element manager 534 learns the device IDs and other configuration information for the source device 528 on the source array 524. The element manager 534 assigns to the target device 532 the device ID (15,1) of the source device 528 in the source array 514. Now the device IDs of the source and target devices 528 and 532 are exactly the same. The element manager 534 then causes the switch 520 to enable the target array facing switch ports 524e, 524f to enable I/O between the switch 520 and the target storage system 516. At this point the host facing switch ports 524a,b and target array facing switch ports 524e,f are not coupled for I/O communication between the host 512 and target array 516.

Alternatively, the device ID of the source device 528 may be obtained manually, and then assigned to the target device 532 manually, rather than learned by the element manager 534. Thus, the element manager is not required in order to assign the source device 420 device ID to the target device 428.

C. Connect Target Device

Figure 21:
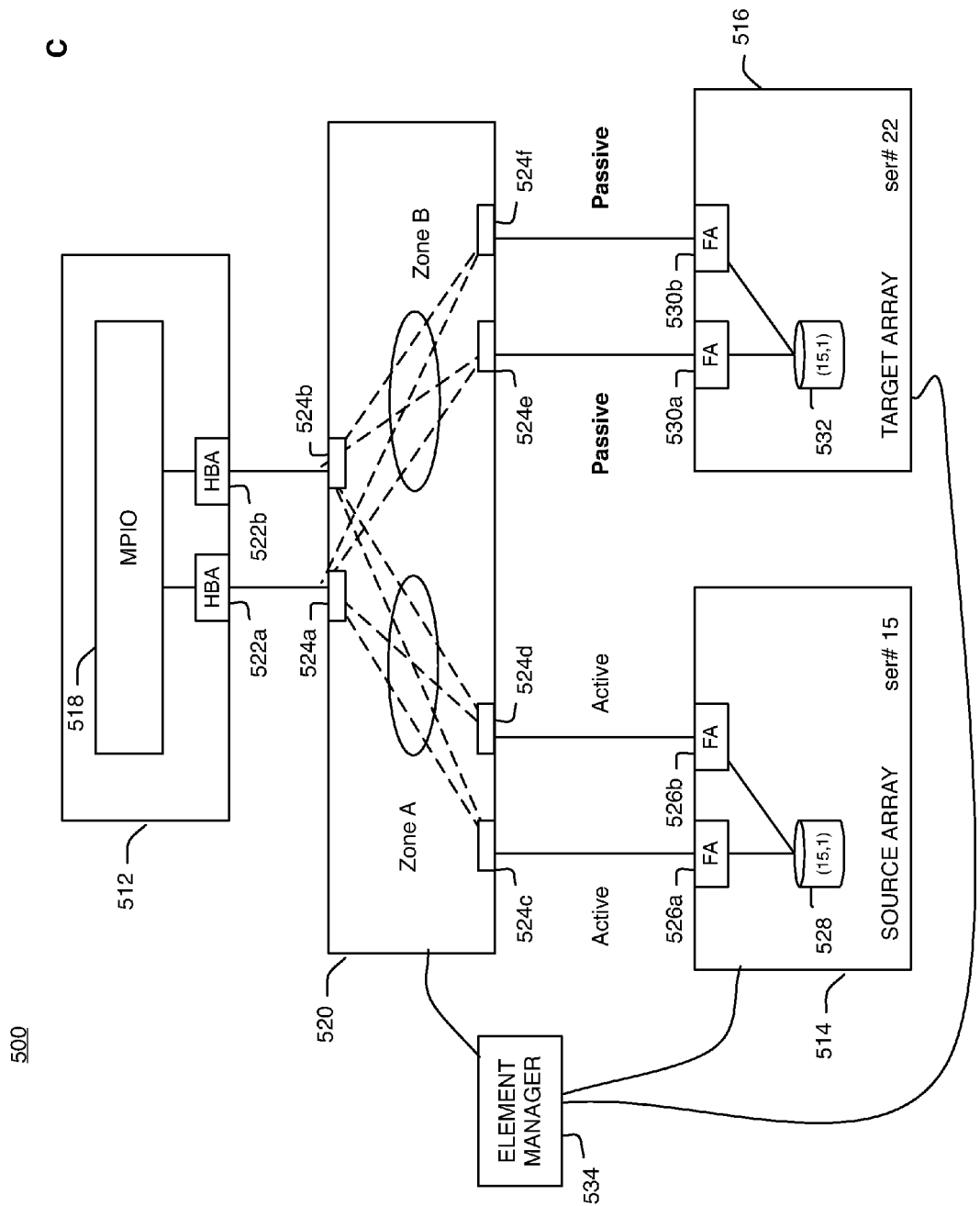
FIG. 21 is a schematic diagram of FIG. 19 wherein a passive connection is established between the target device and host in accordance with the invention.

Next, referring to FIG. 21, a new path is added to connect the target device 532 to the host 512. The element manager accomplishes this by establishing a new zone, Zone B, between the host facing switch ports 524a, 524b and the target array facing switch ports 524e, 524f. Now, when the host 512 issues an inquiry request, the inquiry response received from the device (15,1) appears on both HBAs 522a,b and with different switch port information through the switch 520. It thus appears to the MPIO software 518 that a single device, (15,1), is available via four different paths.

However, once the paths between the target device 532 on the target system 516 and the host 512 are established, the element manager 534 ensures that they respond to the host 512 in a passive mode. Thus, inquiry commands and other control commands from the host can be responded to via these paths. But, I/O reads and writes will be responded to with a check condition indicating that they cannot be completed. These I/Os will be retried via one of the other, active paths (via Zone A) to the device 528, where the application data still resides. This is a stable state.

D. Set Up Data Migration Session

Figure 22:
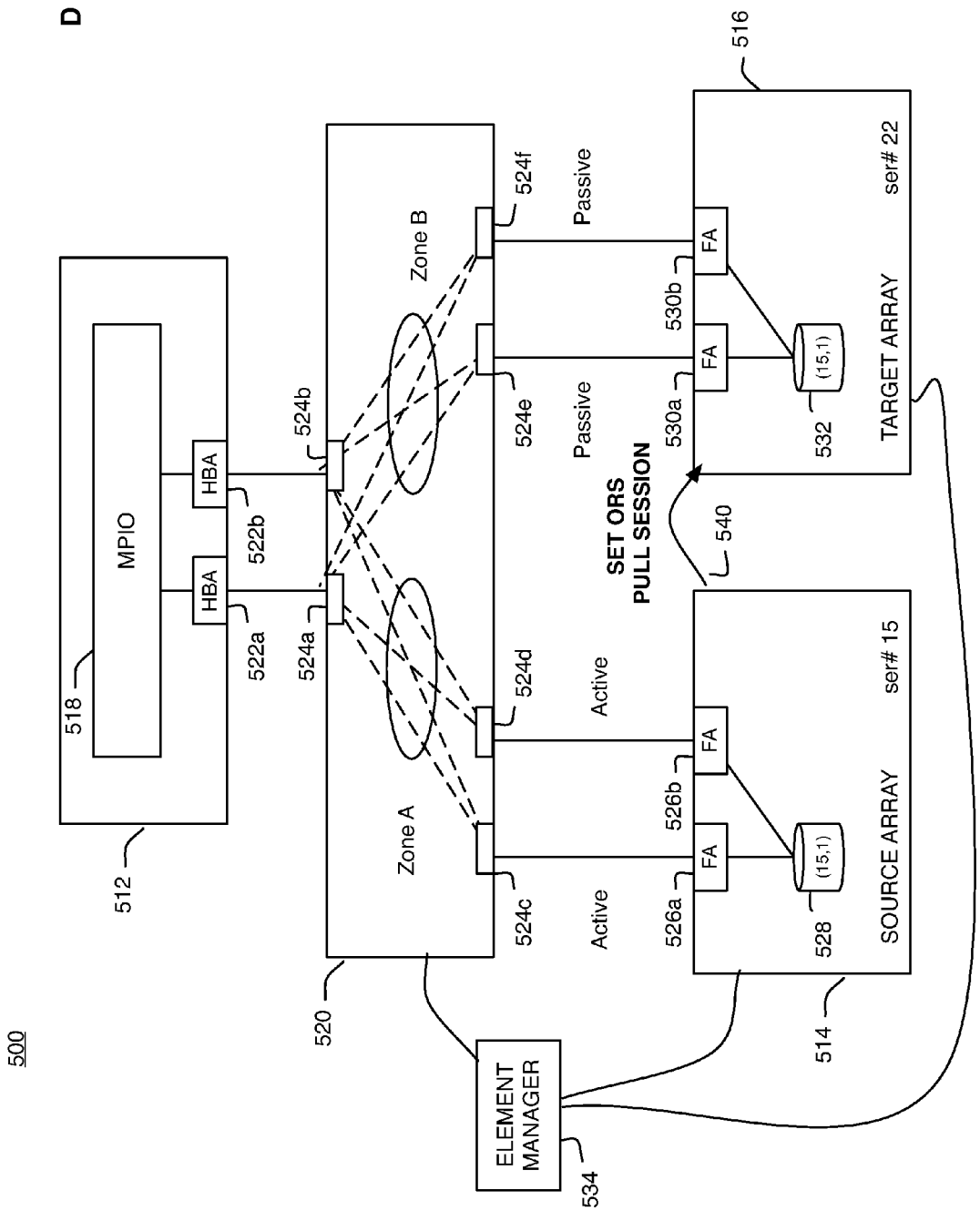
FIG. 22 is a schematic diagram of FIG. 19 wherein the data migration session between the source and target storage device is prepared in accordance with the invention.

Referring now to FIG. 22, the element manager 534 now employs an on-line data migration application to copy the data from the source device 528 on the source array 514 to the target device 532 on the target array 516. In the preferred embodiment, the on-line migration application is ORS. An ORS hot-pull session is "defined" such that it is prepared to begin copying data (540). By defining the session now, relatively time consuming activities are taken care of so that the hot-pull session can be quickly activated.

E. Disable Paths to Source Device

Figure 23:
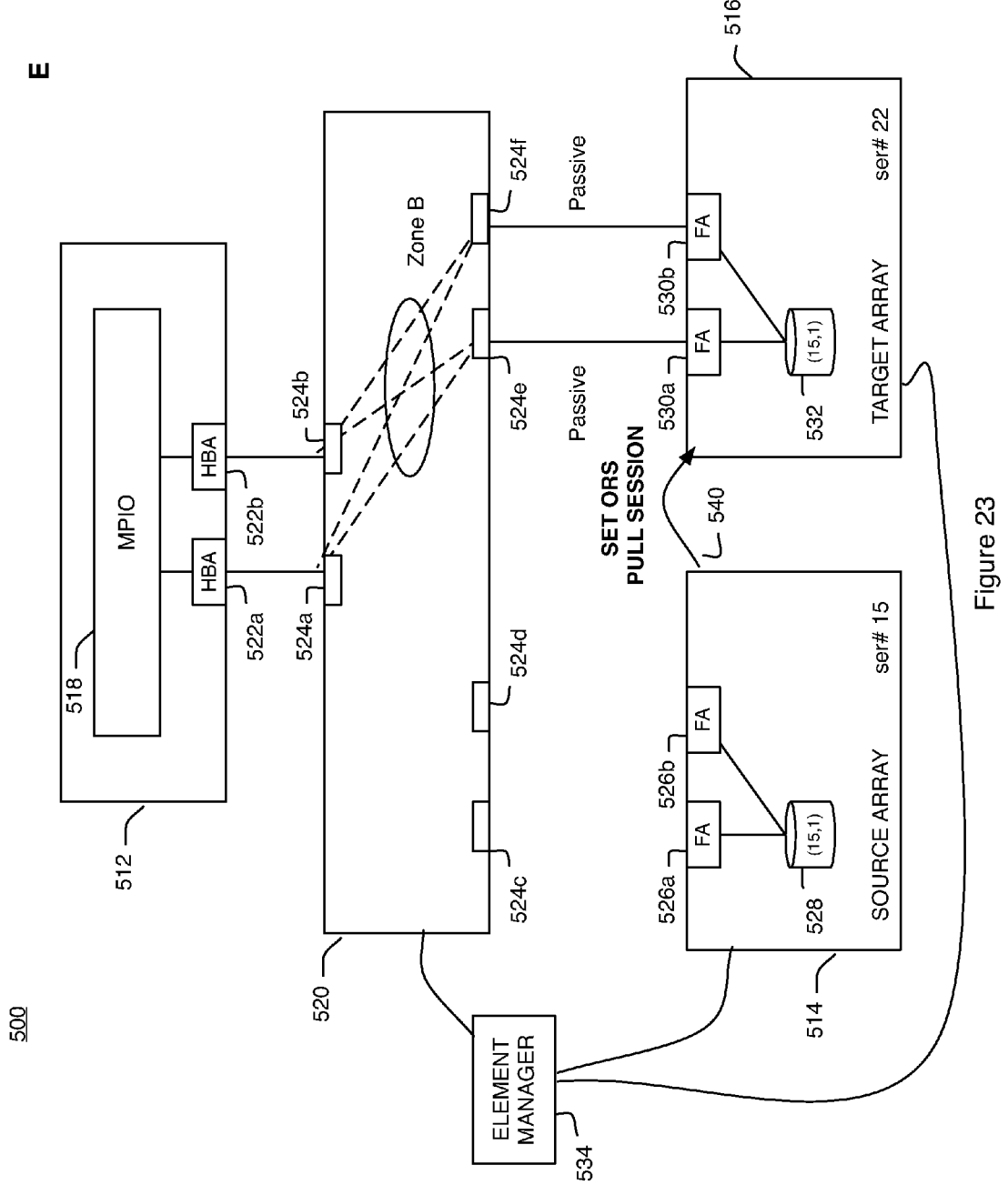
FIG. 23 is a schematic diagram of FIG. 19 wherein the connections to the source storage device are disabled in accordance with the invention.

Referring to FIG. 23, after the on-line migration application is defined, the paths from the host 512 to the source device 528 on the source array 514 are disabled. The element manager 534 accomplishes this in one of several ways. The element manager 534 can cause the switch to disable Zone A between the host facing ports 524a,b and the source array facing ports 524c,d. Or, the element manager 534 can disable the source facing switch ports 524c, d on the switch. Or, the element manager 534 can disable the FA ports 526a, b on the source array 514.

At this point, the host 512 cannot contact the device with device ID (15,1) via an active path at all. The host 512 can perform inquiry requests to a device with device ID (15.1) via Zone B, but cannot complete read or write I/Os. Now, any read or write I/Os issued by the host are being re-tried.

F. Activate Migration Session

Figure 24:
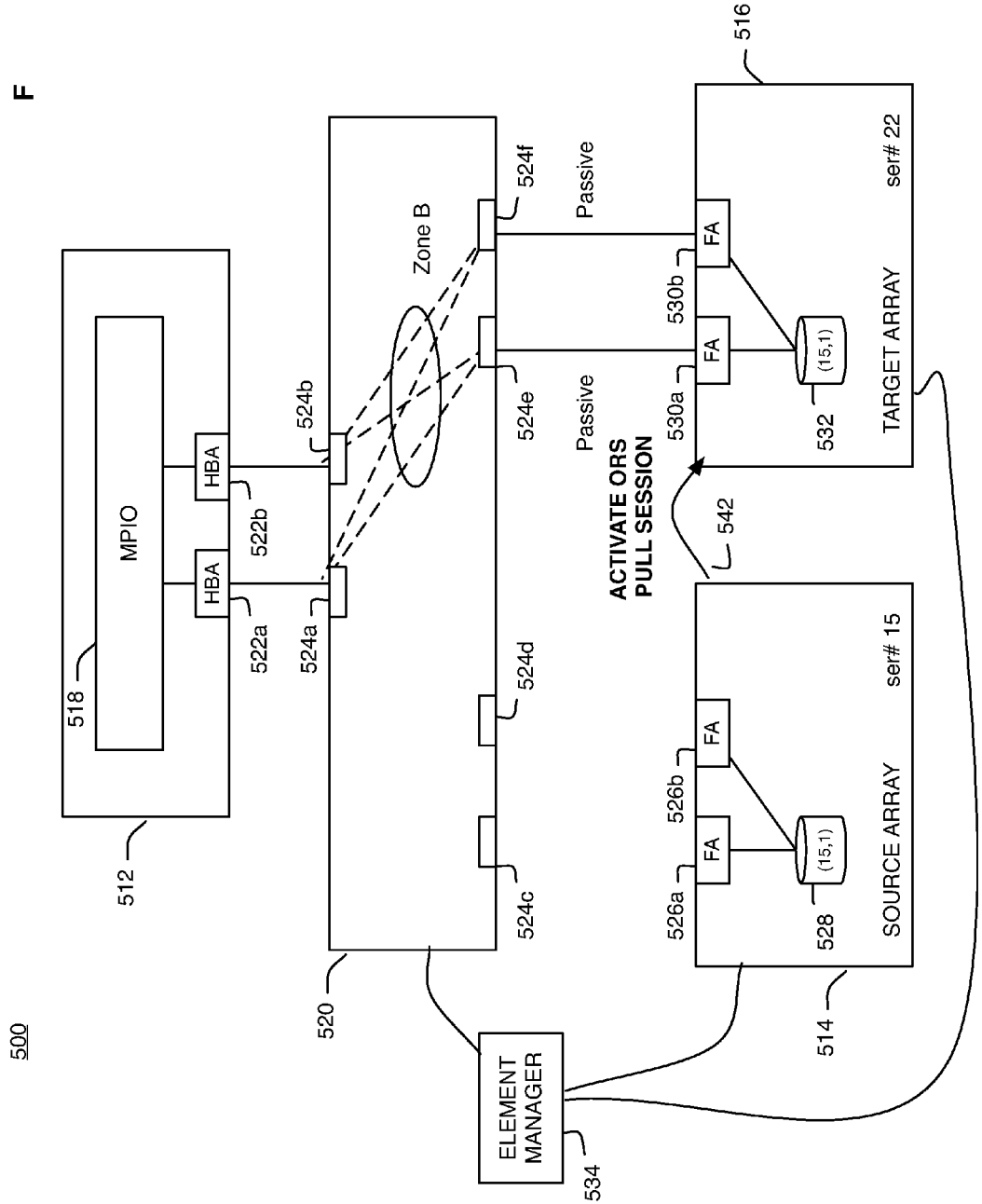
FIG. 24 is a schematic diagram of FIG. 19 wherein the data migration session between the source and target storage device is activated in accordance with the invention.

Referring to FIG. 24, after the paths to the source device have been disabled, the on-line migration application copy session is enabled. In this example, the ORS data migration session 542 is activated by the element manager 534.

Figure 25:
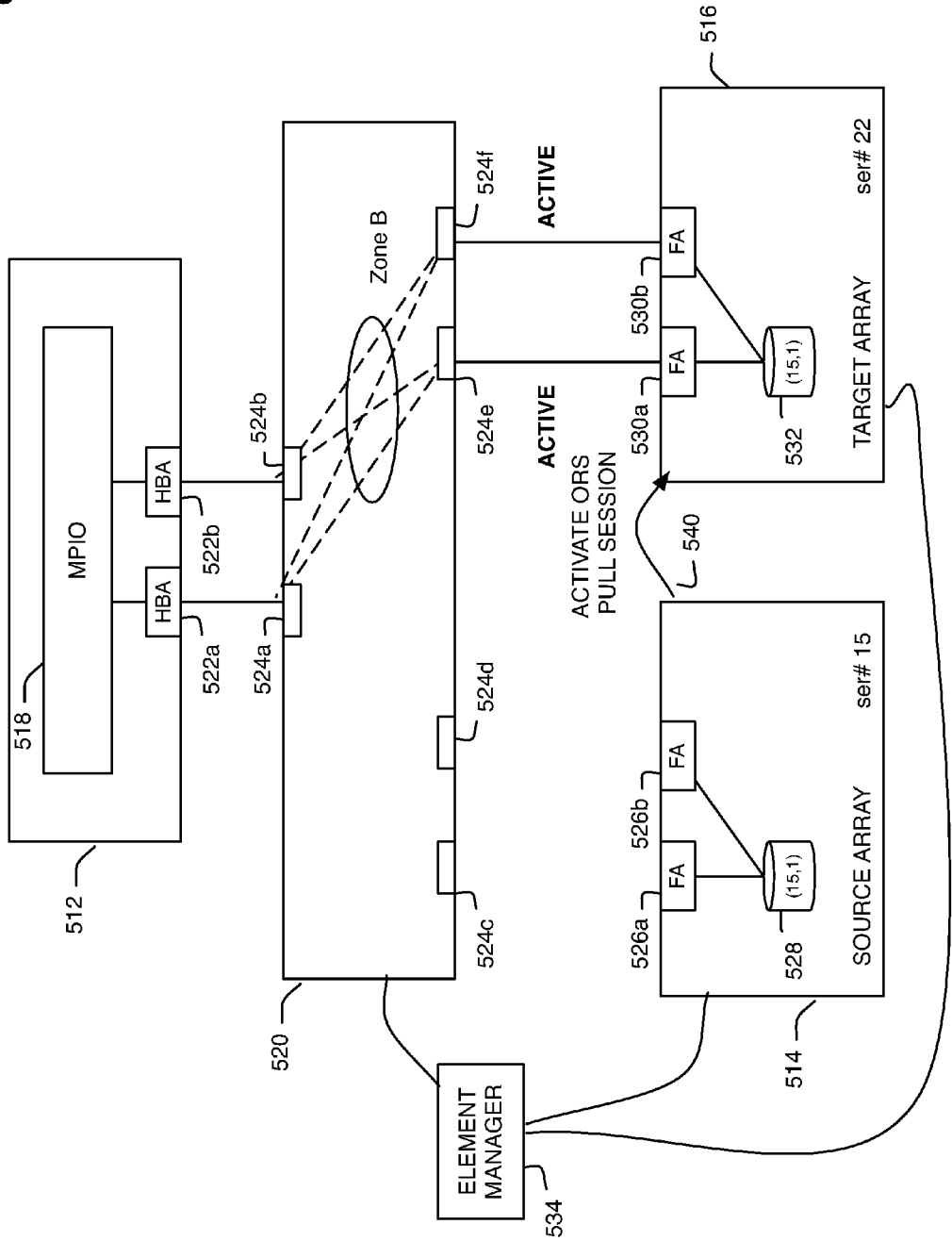
FIG. 25 is a schematic diagram of FIG. 19 wherein the passive connection between the host and target storage device is activated in accordance with the invention.

G. Re-Configure Paths Between Target Device and Host from Passive to Active Mode Now, as shown in FIG. 25, the passive path(s) between the target device 532 on the target array 516 and the host 512 is switched from passive mode to active mode. The element manager 534 now ensures that I/O read and write requests from the host 512 to the device ID (15,1) via Zone B will now be completed. Since the ORS hot-pull session is running, any data not yet present on the target device 532 will be pulled from the source device 528 as needed. Once all data has been migrated from the source device 528 to the target device 532, the source device 528 can be removed.

Note that, during steps 4 and 5, the host cannot access the device (15,1) and must retry I/Os until it finds an active path—that is, it must retry I/Os until step 6 is completed. So again, as with the direct attached embodiment, steps 4, 5, and 6, including all retries, need to be completed within the timeout limit of the host OS—generally about 30 seconds—in order that the migration be non-disruptive. In the great majority of cases, this time limit far exceeds the amount of time needed to complete the migration in accordance with the invention.

Figure 26:
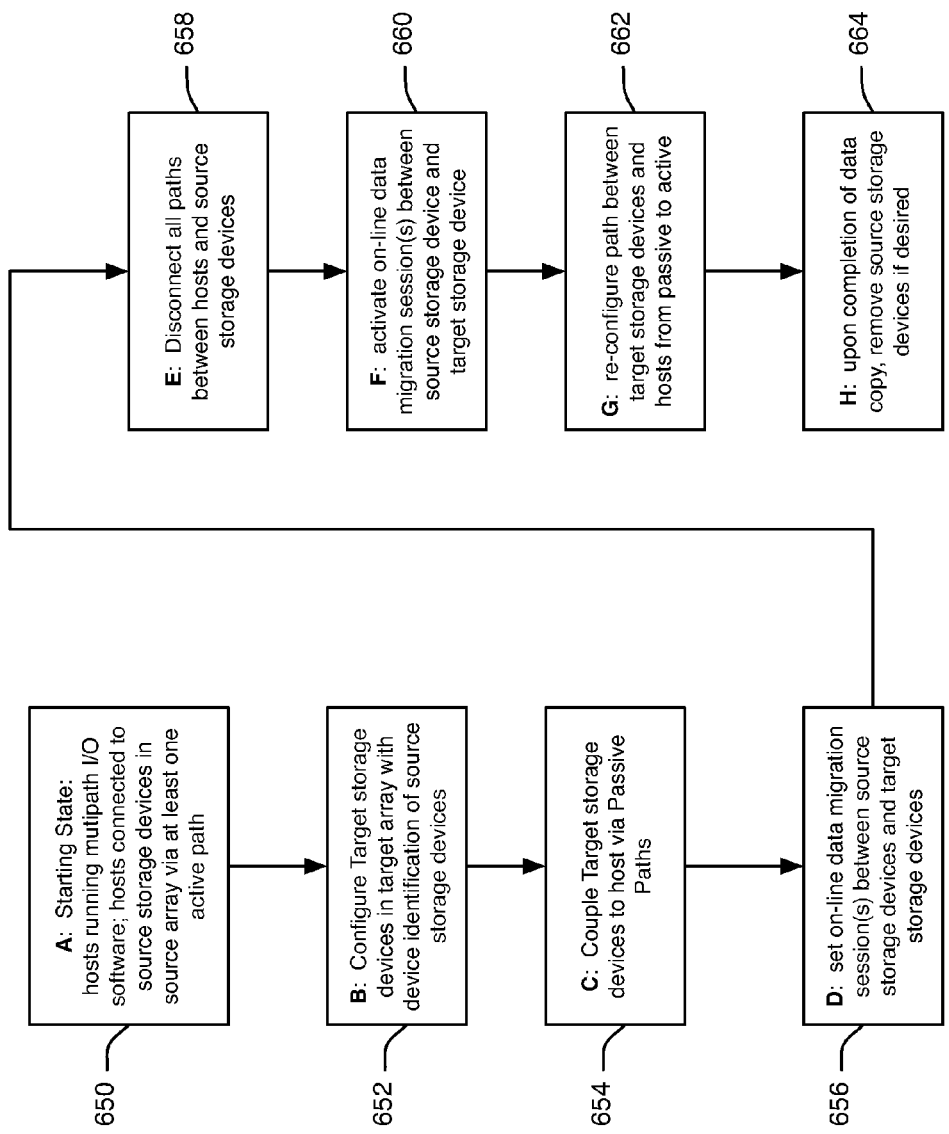
FIG. 26 is a flow diagram of the operation the general non-disruptive data migration mechanism of the invention between multiple hosts, multiple source storage devices, and multiple target storage devices.

Now that it is understood how to implement the invention to migrate the data from one storage device to another on a manner non-disruptive to one host, it can be seen that the invention can employed in a multi-device, multi-host environment such as that shown in FIGS. 4-5. Specifically, as shown in FIG. 26, in step A (650), all hosts are capable of multipathing, and each host is connected to each source storage device to be migrated via at least one active path. In step B (652), for each storage device, a corresponding target storage device is configured with the device identification of the source storage device. In step C (654), all the target storage devices are coupled to all the hosts via passive paths. This need not occur all at once. In step D (656), an on-line data migration session is set between the source storage devices and the target storage devices. Depending on the number of devices involved, several sessions may be required. In step E (658), all paths between all source storage devices and all hosts are disconnected. In step F (660), the on line data migration session(s) are activated. In step G (662), the paths from all the target devices to all the hosts are re-configures from passive to active. At this point, the source storage devices or source arrays can be removed if desired (664).

The present invention is not to be limited in scope by the specific embodiments described herein. Indeed, various modifications of the present invention, in addition to those described herein, will be apparent to those of ordinary skill in the art from the foregoing description and accompanying drawings. For instance, though a RAID 5 3+1 array was used by example, a 7+1 array would employ the same principles of the invention. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A method for use in a system wherein a host is initially coupled to a source storage device on a source storage array, the source storage device having device identification information, the method for migrating data from the source storage device to a target storage device on a target storage array, comprising the steps of:

executing multipath I/O software on the host, the source storage device being coupled to the host via at least one active path of a plurality of paths between the source storage device and the host;

configuring the target storage device with the same device identification information as the source storage device;

coupling the target storage device to the host via at least one passive path o that the target storage device can return its device identification information to the host but cannot respond to I/O read or I/O write requests from the host;

disconnecting all paths between the host and the source storage device;

activating an on-line data migration session between the source storage device and the target storage device;

configuring at least one path between the target storage device and the host from passive to active so that the target storage device can respond to I/O read and I/O write requests during the data migration session.

2. The method of claim 1 wherein the step of configuring the target storage device with the same device identification information as the source storage device comprises:

configuring the target storage device so that the target storage device will respond to a SCSI inquiry request command from the host with a SCSI inquiry response including the source storage device identification information.

3. The method of claim 2 further comprising the step of:

preparing the on-line data migration session between the source storage device and the target storage device before disconnecting all paths between the host and the source storage device so that the on-line data migration session can be activated after the paths between the host and the source data storage device are disconnected.

4. The method of claim 2 wherein the target storage device is coupled to one or more target array ports on the target storage array, and wherein the step of coupling the target storage device to the host via at least one passive path comprises:
for each of one or more target array ports, adding a path between the target array port and a corresponding host port on the host, the path recognizable as an additional path to the source storage device by the multipath software.

5. The method of claim 4 wherein the source storage device is coupled to one or more source array ports on the source storage array, and wherein the one or more source array ports are also coupled to the host, and wherein the step of disconnecting all connections between the host and the source storage device comprises:
disabling all the source array ports.

6. The method of claim 2 wherein the host is coupled to the source storage array and the target storage array via a fabric switch, and wherein the step of coupling the target storage device to the host via a passive path comprises:
adding a passive path between switch ports coupled to the host and switch ports coupled to the target array that is recognized as an additional path to the source storage device by the multipath software.

7. The method of claim 6 further comprising the step of adding a zone within the switch between the switch ports coupled to the host and the switch ports coupled to the target array.

8. The method of claim 7 wherein the step of disconnecting all connections between the host and the source storage device comprises disabling the zone.

9. The method of claim 6 wherein the step of disconnecting all connections between the host and the source storage device comprises disabling switch ports on the switch coupled to the source storage array.

10. A program product comprising a non-transitory computer readable medium having embodied therein a computer program for storing data, the computer program for use in a system wherein a host executing multipath I/O software is initially coupled to a source storage device on a source storage array via at least one active path, the source storage device having device identification information, the program product comprising:
logic for configuring a target storage device in a target storage array with the same device identification information as the source storage device, the source storage device being coupled to the host via at least one active path of a plurality of paths between the source storage device and the host;
logic for enabling the coupling of the target storage device to the host via at least one passive path so that the target storage device can return its device identification information to the host but cannot respond to I/O read or I/O write requests from the host;
logic for disconnecting all paths between the host and the source storage device;
logic for activating an on-line data migration session between the source storage device and the target storage device;
logic for configuring at least one path between the target storage device and the host from passive to active so that the target storage device can respond to I/O read and I/O write requests during the data migration session.

11. The program product of claim 10 wherein the logic for configuring the target storage device with the same device identification information as the source storage device comprises:
configuring the target storage device so that the target storage device will respond to a SCSI inquiry request command from the host with a SCSI inquiry response including the source storage device identification information.

12. The program product of claim 11 further comprising the step of:
preparing the on-line data migration session between the source storage device and the target storage device before disconnecting all paths between the host and the source storage device so that the on-line data migration session can be activated after the paths between the host and the source data storage device are disconnected.

13. The program product of claim 11 wherein the target storage device is coupled to one or more target array ports on the target storage array, and wherein the logic for enabling the coupling of the target storage device to the host via at least one passive path comprises:
logic operable for each of one or more target array ports for adding a path between the target array port and a corresponding host port on the host, the path recognizable as an additional path to the source storage device by the multipath software.

14. The program product of claim 13 wherein the source storage device is coupled to one or more source array ports on the source storage array, and wherein the one or more source array ports are also coupled to the host, and wherein the logic for disconnecting all connections between the host and the source storage device comprises:
logic for disabling all the source array ports.

15. The program product of claim 11 wherein the host is coupled to the source storage array and the target storage array via a fabric switch, and wherein the logic for enabling the coupling of the target storage device to the host via a passive path comprises:
logic for adding a passive path between switch ports coupled to the host and switch ports coupled to the target array that is recognized as an additional path to the source storage device by the multipath software.

16. The program product of claim 15 further comprising logic for adding a zone within the switch between the switch ports coupled to the host and the switch ports coupled to the target array.

17. The of claim 16 wherein the logic for disconnecting all connections between the host and the source storage device comprises logic for disabling the zone.

18. The program product of claim 15 wherein the logic for disconnecting all connections between the host and the source storage device comprises logic for disabling switch ports on the switch coupled to the source storage array.

19. A system comprising:
a host executing multipath I/O software;
a source storage device in a source storage array, the source storage device coupled to the host via at least one active path, the source storage device being coupled to the host via at least one active path of a plurality of paths between the source storage device and the host;
the source storage device having device identification information;
a target storage device in a target storage array;
logic for configuring the target storage device in the target storage array with the same device identification information as the source storage device;

logic for enabling the coupling of the target storage device to the host via at least one passive path so that the target storage device can return its device identification information to the host but cannot respond to I/O read or I/O write requests from the host;

logic for disconnecting all paths between the host and the source storage device;

logic for activating an on-line data migration session between the source storage device and the target storage device;

logic for configuring at least one path between the target storage device and the host from passive to active so that the target storage device can respond to I/O read and I/O write requests during the data migration session.

20. The system of claim 19 wherein the logic for configuring the target storage device with the same device identification information as the source storage device comprises:

configuring the target storage device so that the target storage device will respond to a SCSI inquiry request command from the host with a SCSI inquiry response including the source storage device identification information.

21. The system of claim 20 further comprising:

logic for preparing the on-line data migration session between the source storage device and the target storage device before disconnecting all paths between the host and the source storage device so that the on-line data migration session can be activated after the paths between the host and the source data storage device are disconnected.

22. The system of claim 20 wherein the target storage device is coupled to one or more target array ports on the target storage array, and wherein the logic for enabling the coupling of the target storage device to the host via at least one passive path comprises:

logic operable for each of one or more target array ports for adding a path between the target array port and a corresponding host port on the host, the path recognizable as an additional path to the source storage device by the multipath software.

23. The system of claim 22 wherein the source storage device is coupled to one or more source array ports on the source storage array, and wherein the one or more source array ports are also coupled to the host, and wherein the logic for disconnecting all connections between the host and the source storage device comprises:

logic for disabling all the source array ports.

24. The system of claim 20 wherein the host is coupled to the source storage array and the target storage array via a fabric switch, and wherein the logic for enabling the coupling of the target storage device to the host via a passive path comprises:

logic for adding a passive path between switch ports coupled to the host and switch ports coupled to the target array that is recognized as an additional path to the source storage device by the multipath software.

25. The system of claim 24 further comprising logic for of adding a zone within the switch between the switch ports coupled to the host and the switch ports coupled to the target array.

* * * * *